(12) United States Patent
Yoshikawa

(10) Patent No.: US 10,675,887 B2
(45) Date of Patent: Jun. 9, 2020

(54) LIQUID DISCHARGING APPARATUS AND LIQUID DISCHARGING METHOD

(71) Applicant: SEIKO EPSON CORPORATION, Tokyo (JP)

(72) Inventor: Eishin Yoshikawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/396,875

(22) Filed: Jan. 3, 2017

(65) Prior Publication Data
US 2017/0190190 A1   Jul. 6, 2017

(30) Foreign Application Priority Data

Jan. 5, 2016  (JP) ................................. 2016-000398
Oct. 19, 2016  (JP) ................................. 2016-204926

(51) Int. Cl.
| | | |
|---|---|---|
| B41J 2/21 | (2006.01) | |
| B41J 2/045 | (2006.01) | |
| G06K 15/10 | (2006.01) | |

(52) U.S. Cl.
CPC ......... *B41J 2/2139* (2013.01); *B41J 2/04543* (2013.01); *B41J 2/2132* (2013.01); *G06K 15/105* (2013.01)

(58) Field of Classification Search
CPC .................................................... B41J 2/2139
See application file for complete search history.

(56) References Cited

U.S. PATENT DOCUMENTS 6,283,572 B1 * 9/2001 Kumar ...................... B41J 2/04
                                                                347/19
6,481,816 B1 * 11/2002 Oyen ..................... B41J 2/5056
                                                                347/12

(Continued)

FOREIGN PATENT DOCUMENTS

| JP | 2005-246840 A | 9/2005 |
| JP | 2006-218734 A | 8/2006 |
| JP | 2009078399 A * | 4/2009 |

OTHER PUBLICATIONS

Machine generated English translation of JP2009-078399A to Uchida, "Inkjet Recorder and Recording Method"; translation generated via espacenet.com on Apr. 16, 2019; 24pp.*

*Primary Examiner* — Shelby L Fidler
(74) *Attorney, Agent, or Firm* — Global IP Counselors, LLP

(57) ABSTRACT

A liquid discharging apparatus is provided with a head including a plurality of nozzle groups, a main scanning portion that scans the head in a main scanning direction, a sub-scanning portion that relatively moves the head and the medium in a sub-scanning direction, which intersects the main scanning direction, and a control portion, in which the control portion generates supplementing printing data, which corrects printing data in a manner in which it is possible to supplement with another nozzle within a predetermined nozzle group and executes a printing process on the basis of the supplementing printing data in a case in which it is determined that a predetermined nozzle within the predetermined nozzle group is a non-discharging nozzle when forming a plurality of raster lines on the medium by discharging the liquid from the nozzles of the plurality of nozzle groups.

5 Claims, 13 Drawing Sheets

(56) References Cited

U.S. PATENT DOCUMENTS

2002/0101602 A1* 8/2002 Vilanova .............. G06K 15/107
　　　　　　　　　　　　　　　　　　　　　　358/1.14
2004/0252148 A1* 12/2004 Shibata ................. B41J 2/2139
　　　　　　　　　　　　　　　　　　　　　　347/14

* cited by examiner

FIG. 11

| NUMBER OF NON-DISCHARGING NOZZLES (NOZZLES) | POSSIBLE PRINTING Duty (%) |
|---|---|
| L1 | 100 |
| L2 | 50 |
| L3 | 35 |
| ⋮ | ⋮ |

| BAND REGION Ba | SET PRINTING Duty (%) |
|---|---|
| FIRST BAND REGION Ba1 | 50 |
| SECOND BAND REGION Ba2 | 50 |
| THIRD BAND REGION Ba3 | 50 |
| OVERALL PRINTING Duty (%) | 150 |

FIG. 13

| BAND REGION Ba | PRINTING Duty (%) |
|---|---|
| FIRST BAND REGION Ba1 | 35 |
| SECOND BAND REGION Ba2 | 57.5 |
| THIRD BAND REGION Ba3 | 57.5 |
| OVERALL PRINTING Duty (%) | 150 |

FIG. 14

| BAND REGION Ba | PRINTING Duty (%) |
|---|---|
| FIRST BAND REGION Ba1 | 35 |
| SECOND BAND REGION Ba2 | 35 |
| THIRD BAND REGION Ba3 | 35 |
| OVERALL PRINTING Duty (%) | 105 |

LIQUID DISCHARGING APPARATUS AND LIQUID DISCHARGING METHOD

BACKGROUND

1. Technical Field

The present invention relates to a liquid discharging apparatus and liquid discharging method.

2. Related Art

In the related art, an ink jet recording apparatus that is provided with a plurality of heads, and that supplements a non-discharging nozzle with another nozzle in multi-pass character printing using the plurality of heads, is known (for example, refer to JP-A-2005-246840).

However, in the above-mentioned apparatus, for example, in a case of supplementing with a nozzle of a head other than a head to which a non-discharging nozzle belongs, there is a problem in that a landing position of supplemented ink deviates due to an attachment error between the heads, or the like, and therefore, the image quality is reduced.

SUMMARY

The invention can be realized as the following aspects or application examples.

Application Example 1

According to this application example, there is provided a liquid discharging apparatus including a head including a plurality of nozzle groups in which nozzles are arranged, and that is capable of discharging a liquid onto a medium, a main scanning portion that scans the head in a main scanning direction, a sub-scanning portion that relatively moves the head and the medium in a sub-scanning direction, which intersects the main scanning direction, and a control portion, in which the control portion generates supplementing printing data, which corrects printing data in a manner in which it is possible to supplement with another nozzle within a predetermined nozzle group and executes a printing process on the basis of the supplementing printing data in a case in which it is determined that a predetermined nozzle within the predetermined nozzle group is a non-discharging nozzle when forming a plurality of raster lines on the medium by discharging the liquid from the nozzles of the plurality of nozzle groups.

According to the application example, in a case in which a non-discharging nozzle occurs, supplementing printing data is generated for nozzles of the same nozzle group to which the non-discharging nozzle belongs, and the printing process is carried out on the basis of the supplementing printing data. As a result of this, it is possible to supplement a deficit in an image that occurs due to the non-discharging nozzle. Further, in this case, a non-discharging nozzle and a supplementing nozzle are nozzles within the same nozzle group. Accordingly, effects such as attachment error (alignment error) of the nozzle group are reduced, and therefore, variation in a landing position of the liquid with respect to the medium is suppressed, and it is possible to prevent deterioration in image quality. Additionally, for example, the term non-discharging nozzle refers to a nozzle in a state in which the liquid is not being discharged from a nozzle as a result of a contaminant being attached to the nozzle or an air bubble being incorporated in the nozzle.

Application Example 2

In the liquid discharging apparatus according to the application example, the control portion generates the supplementing printing data in a manner in which it is possible to supplement with the other nozzles, which are the other nozzles within the predetermined nozzle group and which correspond to the same raster line as a raster line that corresponds to the non-discharging nozzle.

According to the application example, in a case in which a non-discharging nozzle occurs, a nozzle that corresponds to the same raster line to which the non-discharging nozzle belongs corresponds to a supplementing nozzle. As a result of this, effects such as attachment error (alignment error) of the nozzle group are reduced, and furthermore, since variation in a landing position of the liquid with respect to the medium is suppressed, it is possible to prevent deterioration in image quality.

Application Example 3

In the liquid discharging apparatus according to the application example, the control portion generates the supplementing printing data in a manner in which it is possible to supplement with the other nozzles, which are the other nozzles within the predetermined nozzle group and which correspond to a different raster line that is disposed in the periphery of a raster line that corresponds to the non-discharging nozzle.

According to the application example, in a case in which a non-discharging nozzle occurs, supplementing is carried out with a nozzle that corresponds to the same raster line to which the non-discharging nozzle belongs as a supplementing nozzle, and a supplementing process is also carried out for nozzles that correspond to another raster line in the periphery of the same raster line to which the non-discharging nozzle belongs. As a result of this, since supplementing is carried out using a plurality of raster lines, it is possible to make changes in the image quality in the periphery of a supplemented region more gradual, and therefore, it is possible to prevent deterioration in image quality.

Application Example 4

In the liquid discharging apparatus according to the application example, the control portion generates supplementing printing data, which corrects printing data in a manner in which it is possible to supplement with a plurality of nozzles within another nozzle group that differs from the predetermined nozzle group and execute the printing process on the basis of the supplementing printing data when it is determined that it is not possible to supplement with the other nozzles within the predetermined nozzle group in a case in which it is determined that the predetermined nozzle within the predetermined nozzle group is a non-discharging nozzle.

According to the application example, supplementing is carried out with nozzles of a different nozzle group to the nozzle group to which the non-discharging nozzle belongs, but since supplementing is carried out using a plurality of nozzles of the different nozzle group, effects such as attachment error (alignment error) between nozzle groups are dispersed, and therefore, it is possible to prevent deterioration in image quality.

Application Example 5

According to this application example, there is provided a liquid discharging method of a liquid discharging apparatus provided with a head including a plurality of nozzle groups in which nozzles are arranged, and that is capable of discharging a liquid onto a medium, a main scanning portion that scans the head in a main scanning direction, a sub-scanning portion that relatively moves the head and the medium in a sub-scanning direction, which intersects the main scanning direction, and a control portion, the method including generating supplementing printing data, which corrects printing data in a manner in which it is possible to supplement with other nozzles within a predetermined nozzle group, and executing a printing process on the basis of the supplementing printing data in a case in which it is determined that a predetermined nozzle within the predetermined nozzle group is a non-discharging nozzle when forming a plurality of raster lines on the medium by discharging the liquid from the nozzles of the plurality of nozzle groups.

According to the application example, in a case in which a non-discharging nozzle occurs, supplementing printing data is generated for nozzles of the same nozzle group to which the non-discharging nozzle belongs, and the printing process is carried out on the basis of the supplementing printing data. As a result of this, it is possible to supplement a deficit in an image that occurs due to the non-discharging nozzle. Further, in this case, a non-discharging nozzle and a supplementing nozzle are nozzles within the same nozzle group. Accordingly, effects such as attachment error (alignment error) of the nozzle group are reduced, and therefore, variation in a landing position of the liquid with respect to the medium is suppressed, and it is possible to prevent deterioration in image quality.

Application Example 6

According to this application example, there is provided a liquid discharging apparatus provided with a head including a plurality of nozzle groups in which nozzles are arranged, and that is capable of discharging a liquid onto a medium, a main scanning portion that scans the head in a main scanning direction, a sub-scanning portion that relatively moves the head and the medium in a sub-scanning direction, which intersects the main scanning direction, and a control portion that forms a plurality of raster lines on the medium by discharging the liquid from the nozzles of the plurality of nozzle groups, in which the control portion acquires a possible printing Duty of a predetermined nozzle group on the basis of a number of occurrences of non-discharging nozzles in the predetermined nozzle group, compares a set printing Duty that the predetermined nozzle group is to print among an overall printing Duty, and the possible printing Duty, and supplements a printing Duty with another nozzle group in a case in which the possible printing Duty is smaller than the set printing Duty.

According to the application example, even in a case in which the occurrence number of non-discharging nozzle in a predetermined nozzle group is comparatively high, the printing Duty is supplemented with other nozzle groups in a case in which the possible printing Duty on a predetermined nozzle group is smaller than the set printing Duty. As a result of this, effects on the image are reduced, and therefore, it is possible to suppress deterioration in the quality of an overall image.

The "printing duty" is a value that is calculated using printing duty (%)=actual recording dot number/(vertical resolution×horizontal resolution)×100 (in the equation, the "actual recording dot number" is an actual number of recording dots per unit area, and the "vertical resolution" and the "horizontal resolution" are respectively resolutions per unit area). In addition, the possible printing Duty is the upper limit value of the printing Duty in a predetermined nozzle group. The overall printing Duty is a total value of the printing Duties of a plurality of nozzle groups. The set printing Duty is a printing Duty, among the overall printing Duty, that is allocated to each nozzle group.

Application Example 7

The liquid discharging apparatus according to the application example includes a plurality of other nozzle groups, and the control portion equally supplements the printing Duties with the plurality of other nozzle groups in a case in which the possible printing Duty is smaller than the set printing Duty.

According to the application example, a distribution process of printing Duty when supplementing other nozzle groups is facilitated.

Application Example 8

In the liquid discharging apparatus according to the application example, the control portion outputs an error in a case in which a total value of the possible printing Duties of the predetermined nozzle group and the other nozzle group is smaller than the overall printing Duty.

According to the application example, it is possible to preemptively prevent the generation of deterioration in the quality of an overall image. In addition, as a result of outputting an error, it is possible to encourage a user to perform head replacement, or the like.

Application Example 9

According to this application example, there is provided a liquid discharging method of a liquid discharging apparatus provided with a head including a plurality of nozzle groups in which nozzles are arranged, and that is capable of discharging a liquid onto a medium, a main scanning portion that scans the head in a main scanning direction, a sub-scanning portion that relatively moves the head and the medium in a sub-scanning direction, which intersects the main scanning direction, and a control portion, the method including acquiring a possible printing Duty of a predetermined nozzle group on the basis of a number of occurrences of non-discharging nozzles in the predetermined nozzle group, comparing a set printing Duty that the predetermined nozzle group is to print among an overall printing Duty, and the possible printing Duty, and supplementing a printing Duty with another nozzle group in a case in which the possible printing Duty is smaller than the set printing Duty when forming a plurality of raster lines on the medium by discharging the liquid from the nozzles of the plurality of nozzle groups.

According to the application example, even in a case in which the occurrence number of non-discharging nozzle in a predetermined nozzle group is comparatively high, the printing Duty is supplemented with other nozzle groups in a case in which the possible printing Duty on a predetermined nozzle group is smaller than the set printing Duty. As a result of this, effects on the image are reduced, and therefore, it is possible to suppress deterioration in the quality of an overall image.

BRIEF DESCRIPTION OF THE DRAWINGS

The invention will be described with reference to the accompanying drawings, wherein like numbers reference like elements.

FIG. 11 is an explanatory view that shows a configuration of a control portion according to a third embodiment.

FIG. 12 is an explanatory view that shows a configuration of the control portion according to the third embodiment.

FIG. 13 is an explanatory view that shows a configuration of the control portion according to the third embodiment.

FIG. 14 is an explanatory view that shows a configuration of the control portion according to the third embodiment.

DESCRIPTION OF EXEMPLARY EMBODIMENTS

Hereinafter, a first and second embodiment of the invention will be described with reference to the drawings. Additionally, in each of the drawings below, the scale of each layer and each member is altered from an actual scale in order to set each layer and each member to a recognizable size.

First Embodiment

Figure 1:
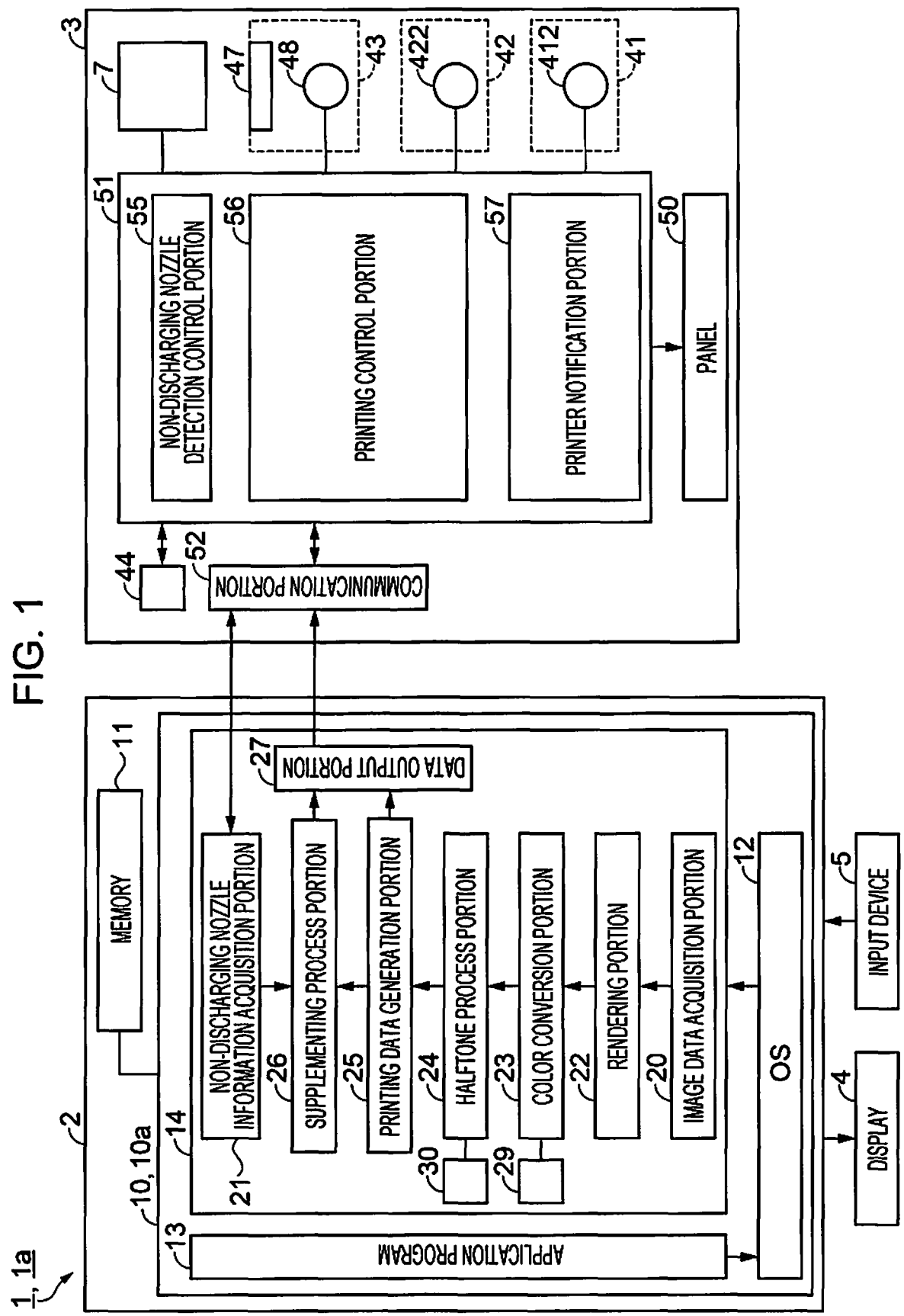
FIG. 1 is a block diagram that shows a configuration of a liquid discharging apparatus according to a first embodiment.
Figure 2:
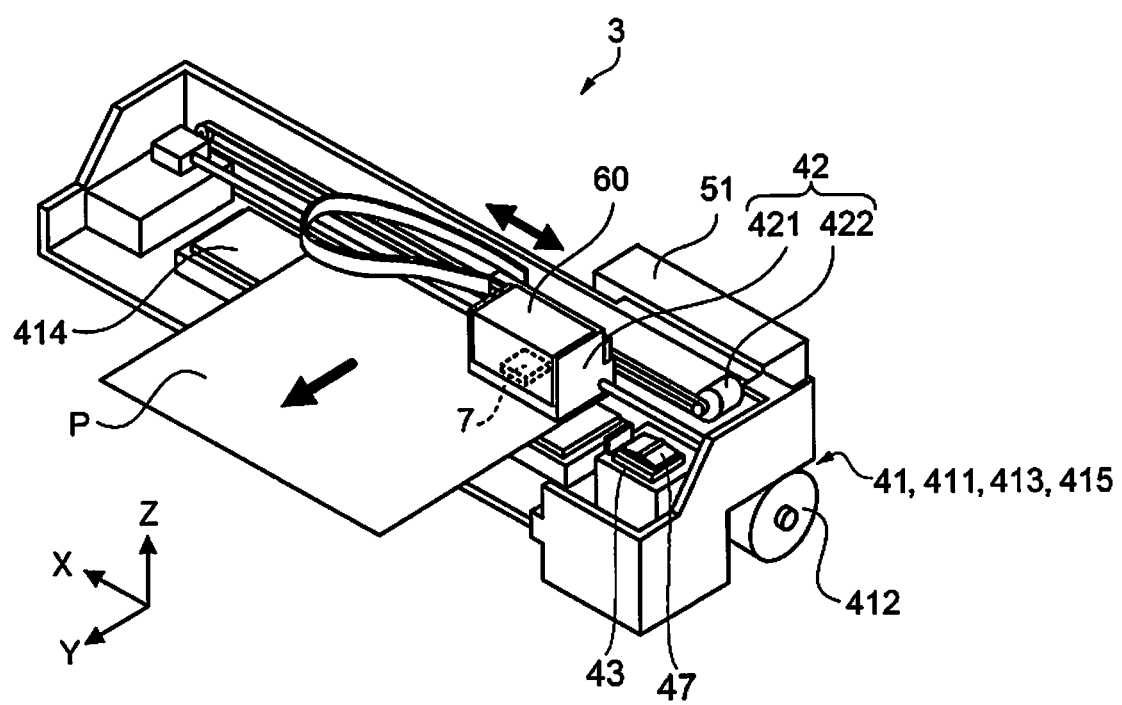
FIG. 2 is a perspective view that shows a configuration of a printer according to the first embodiment.

Firstly, a configuration of a liquid discharging apparatus will be described. A liquid discharging apparatus is an apparatus provided with a head including a plurality of nozzles that are capable of discharging a liquid onto a medium, a main scanning portion that scans the head in a main scanning direction, a sub-scanning portion that relatively moves the head and the medium in a sub-scanning direction, which intersects the main scanning direction, and a control portion. FIG. 1 is a block diagram that shows a configuration of a liquid discharging apparatus, and FIG. 2 is a perspective view that shows a configuration of a printer.

As shown in FIG. 1, a liquid discharging apparatus 1 is a printing system that is provided with a computer 2 and a printer 3. A display 4, and an input device 5 such as a keyboard or a mouse are connected to the computer 2. The printer 3 is provided with a head 7, discharges an ink, as a liquid, from the head 7 as ink droplets, and is configured to be capable of printing on printing paper P, as a medium. For example, the printer 3 is a serial type ink jet printer.

As shown in FIG. 1, the computer 2 is provided with an image processing control portion 10 (a control portion), and an operating system (OS) 12, an application program 13, and a printer driver 14 are operated in the image processing control portion 10. The application program 13 is software that creates image data of an image. The printer driver 14 outputs the image data to the printer 3 by converting the image data into printing data, and forms a printed image on printing paper P by driving and controlling the printer 3 using the printing data. Various storage portions 11 are connected to the image processing control portion 10.

The printer driver 14 is provided with an image data acquisition portion 20, a non-discharging nozzle information acquisition portion 21, a rendering portion 22, a color conversion portion 23, a halftone process portion 24, a printing data generation portion 25, a supplementing process portion 26, and a data output portion 27. In addition, the printer driver 14 is provided with a color process lookup table 29 and an SML table 30, which are developed in the memory of the image processing control portion 10.

The image data acquisition portion 20 acquires image data from the application program 13 via the OS 12.

When the image data acquisition portion 20 acquires image data, the non-discharging nozzle information acquisition portion 21 checks with the printer 3 to see whether or not there is a non-discharging nozzle that has a discharge fault in which it is not possible to discharge ink droplets in the head 7. In addition, in a case in which there is a non-discharging nozzle, nozzle information that specifies the corresponding non-discharging nozzle is acquired from the printer 3.

The rendering portion 22 performs a rendering process on image data supplied from the application program 13, and converts each pixel of the image data into RGB multi-value data.

The color conversion portion 23 converts the RGB multi-value data of each pixel into ink quantity data of each color of ink by referring to the color process lookup table 29. In the color process lookup table 29, colors composed of respective combinations of R, G, and B, and ink quantity data of each color of ink are stored and maintained in an association manner.

The halftone process portion 24 converts the ink quantity data of each color of ink into dot ratio data, which shows a ratio of blank dots, in which the ink is not discharged, and three types of ink droplet having different diameters, on the basis of the SML table 30. In the SML table 30, gradation values of colors based on ink quantity data of each color, and use ratios of blank dots, and three types of dot of small dots having a first size, medium dots, which are a second size that is larger than the first size, and large dots, which are a third size that is larger than the second size, are stored and maintained in an association manner.

The printing data generation portion 25 generates printing data of a format that the printer 3 is capable of interpreting, from the dot ratio data generated by the halftone process portion 24. More specifically, in the printing data generation portion 25, a configuration proportion of pixel data to be allocated to each nozzle is stipulated for each pass by rearranging image data, which is configured from pixel data disposed in matrix form, into a data sequence to be transmitted to the printer 3.

The supplementing process portion 26 generates supplementing printing data, which corrects printing data in a manner in which it is possible to supplement with another nozzle within a predetermined nozzle group, in a case in which it is determined that a predetermined nozzle within predetermined nozzle groups (for example, first to third nozzle groups 95a, 95b and 95c (refer to FIG. 3)) is a non-discharging nozzle. More specifically, in a case in which it is determined by the non-discharging nozzle information acquisition portion 21 that there is a non-discharging nozzle, supplementing printing data, which corrects the printing data on the basis of the nozzle information, is generated. The supplementing printing data is data for causing ink droplets discharged from another nozzle to land in a predetermined landing region of a printing medium in which intended ink droplets discharged from the non-discharging nozzle should land.

To explain in more detail, in the supplementing process portion 26, a supplementing nozzle that is capable of supplementing a non-discharging nozzle is selected on the basis of the nozzle information. In the present embodiment, selection of a supplementing nozzle is performed giving priority to nozzles of the same nozzle group as a nozzle group to which a non-discharging nozzle belongs. Furthermore, in the present embodiment, a supplementing nozzle is set giving priority to nozzles that are nozzles of the same nozzle group as a nozzle group to which a non-discharging nozzle belongs and that correspond to the same raster line as a raster line that corresponds to the non-discharging nozzle. Further, in the generation of the supplementing printing data, the configuration proportion of the pixel data that corresponds to a non-discharging nozzle is decreased, and a configuration proportion of pixel data of an amount corresponding to the decreased amount is distributed to a supplementing nozzle on the basis of the nozzle information and the printing data. Accordingly, in the supplementing nozzle, on the basis of the supplementing printing data, the ink is caused to land in a region in which normal ink droplets of the supplementing nozzle are caused to land, and it is also possible to cause ink droplets to land in a region in which it was intended that ink droplets discharged from a non-discharging nozzle would be caused to land.

Furthermore, in the supplementing process portion 26 of the present embodiment, another nozzle that is a nozzle of the same nozzle group as a nozzle group to which a non-discharging nozzle belongs and that correspond to a different raster line, which is disposed in the periphery of a raster line that corresponds to the non-discharging nozzle, is also set as a supplementing nozzle. Further, in the generation of the supplementing printing data, in the above-mentioned manner, the configuration proportion of the pixel data is distributed to a nozzle that corresponds to the same raster line as a raster line that corresponds to a non-discharging nozzle, and the configuration proportion of the pixel data that corresponds to a nozzle in the periphery of the non-discharging nozzle is decreased, and a configuration proportion of pixel data of an amount corresponding to the decreased amount is distributed to another nozzle that corresponds to a different raster line. Accordingly, it is possible to make changes in the image quality of a supplemented region in which supplementing is performed due to a non-discharging nozzle, more gradual.

The data output portion 27 outputs printing data or supplementing printing data to the printer 3. More specifically, the data output portion 27 outputs printing data to the printer 3 in a case in which the printing data generation portion 25 generates printing data and nozzle information of a non-discharging nozzle is not acquired by the non-discharging nozzle information acquisition portion 21. On the other hand, the data output portion 27 outputs supplementing printing data, which is generated by the supplementing process portion 26, to the printer 3 in a case in which nozzle information of a non-discharging nozzle is acquired.

Next, a configuration of a printer will be described. As shown in FIGS. 1 and 2, the printer 3 is provided with the head 7, a transport unit 41 as a sub-scanning portion, a carriage unit 42 as a main scanning portion, a maintenance mechanism 43, a non-discharging nozzle detection mechanism 44, and a printer control portion 51. Additionally, in FIG. 2, for convenience of description, an X axis, a Y axis and a Z axis are illustrated as three axes that are orthogonal to one another, a tip end side of an arrow that illustrates an axial direction is referred to as a "+ side", and a base end side thereof is referred to as a "− side". In addition, hereinafter, a direction that is parallel to the X axis referred to as an "X axis direction" or a "main scanning direction", a direction that is parallel to the Y axis referred to as a "Y axis direction" or a "sub-scanning direction", and a direction that is parallel to the Z axis referred to as a "Z axis direction".

The carriage unit 42 is a scanning means for scanning (moving) the head 7 in a predetermined movement direction (the X axis direction that is shown in FIG. 2, hereinafter, referred to as the main scanning direction). In addition, the carriage unit 42 is a unit that moves the head 7 between a printing position and the maintenance mechanism 43, which is separated from the printing position. The carriage unit 42 includes a carriage 421, a carriage motor 422, and the like. The carriage 421 maintains the head 7, which includes a plurality of nozzles 73 (refer to FIG. 3) that are capable of discharging the ink, as a liquid, onto printing paper P, and an ink cartridge 60. The ink cartridge 60 is a component in which the ink discharged from the head 7 is accumulated, and is attached to the carriage 421 in a removable manner. The carriage 421 is capable of reciprocating in the main scanning direction, and is driven by the carriage motor 422. As a result of this, the head 7 is moved in the main scanning direction (a ±X axis direction).

The transport unit 41 is a transport means for transporting (moving) printing paper P in the sub-scanning direction (the Y axis direction that is shown in FIG. 2), which intersects the main scanning direction. The transport unit 41 includes a paper feeding roller 411, a transport motor 412, a transport roller 413, a platen 414, a paper ejection roller 415, and the like. The paper feeding roller 411 is a roller for performing paper feeding of printing paper P inserted into a paper insertion port (not illustrated in the drawings) to the inner portion of the printer 3. The transport roller 413 is a roller that transports printing paper P fed by the paper feeding roller 411 up to a region in which printing is possible, and is driven by the transport motor 412. The platen 414 is a component that supports printing paper P during printing. The paper ejection roller 415 is a roller that ejects printing paper P to the outer portion of the printer 3, and is provided on a downstream side in the sub-scanning direction with respect to the region in which printing is possible.

The head 7 is a component for discharging the ink onto printing paper P as liquid droplets (hereinafter, also referred to as ink droplets). The head 7 is provided with the plurality of nozzles 73. Since the head 7 is mounted in the carriage 421, the head 7 also moves in the main scanning direction when the carriage 421 moves in the main scanning direction. Further, rows (raster lines) of dots are formed on printing paper P along the main scanning direction as a result of the head 7 discharging the ink during movement in the main scanning direction.

Figure 3:
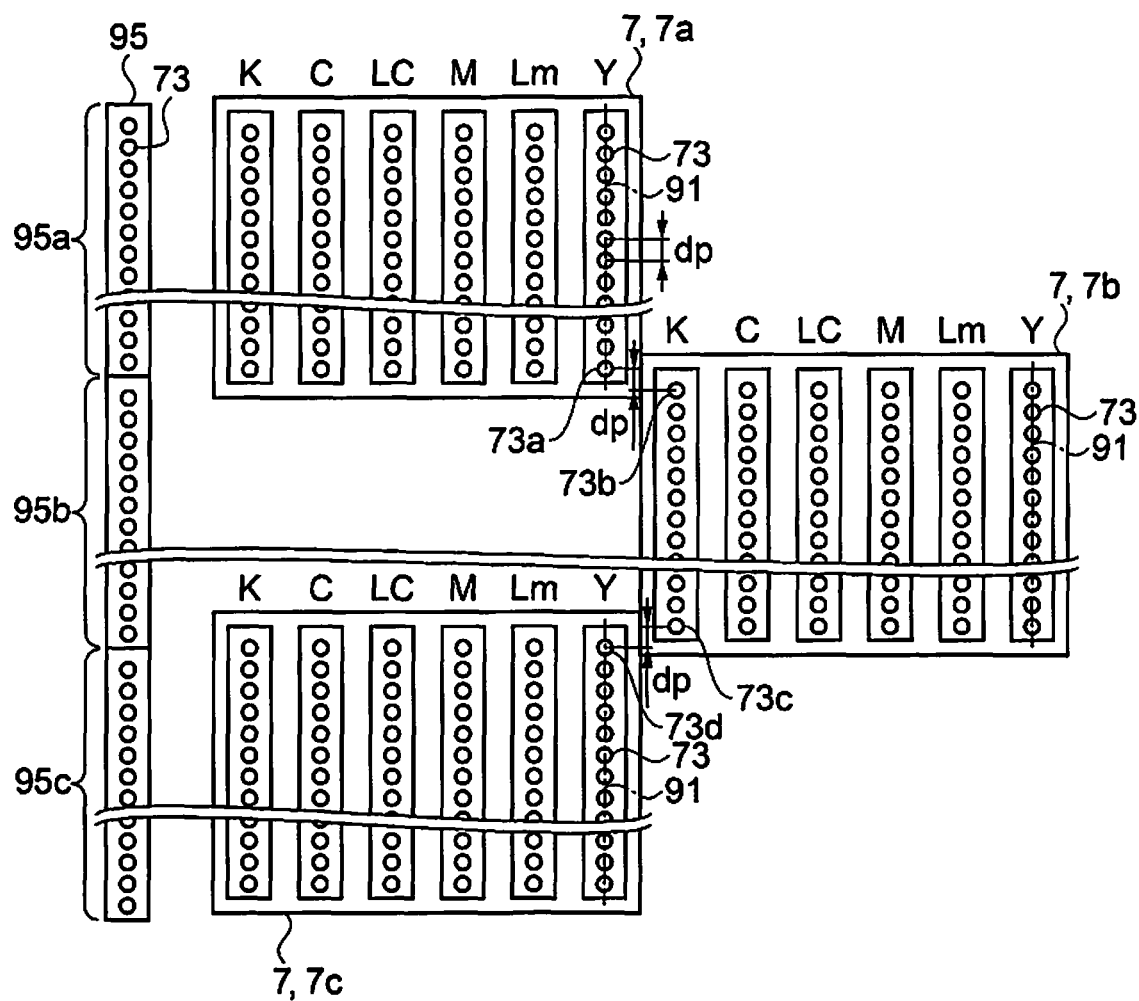
FIG. 3 is a schematic view that shows a configuration of a head according to the first embodiment.

In this instance, a configuration of the head will be described. FIG. 3 is a schematic view that shows a configuration of the head, and FIG. 4 is a cross-sectional view that shows a configuration of the head.

Additionally, in the present embodiment, as shown in FIG. 3, a case of a head configured by three heads 7 (a first head 7a, a second head 7b, and a third head 7c) will be described. A nozzle row 91 is respectively provided for each ink color in the first head 7a, the second head 7b, and the third head 7c. In the present embodiment, a nozzle row 91 is provided for each ink color of black (K), cyan (C) light cyan (LC), magenta (M), light magenta (LM), and yellow (Y). Each nozzle row 91 is provided with a plurality of nozzles 73, which are aligned in the sub-scanning direction at a constant nozzle pitch dp. A nozzle 73a of an end portion of a nozzle row 91 of the first head 7a, and a nozzle 73b of an end portion of a nozzle row 91 of the second head 7b are shifted in the sub-scanning direction by an amount corresponding to the same size as the nozzle pitch dp in a nozzle row 91. A nozzle 73c of the other end portion of a nozzle row 91 of the second head 7b, and a nozzle 73d of an end portion of a nozzle row 91 of the third head 7c are shifted in the sub-scanning direction by an amount corresponding to the same size as the nozzle pitch dp in a nozzle row 91. Additionally, in the present embodiment, the first head 7a, the second head 7b, and the third head 7c are disposed alternately (in a staggered manner) along the sub-scanning direction. In this case, the nozzle rows corresponding to a single color of the three heads 7 (the first head 7a, the second head 7b, and the third head 7c) are the same as a nozzle row 95 (a virtual nozzle row illustrated on the left hand side in FIG. 3), which has three times the number of nozzles of the number of nozzles of a single color of a single recording head 7. In the following description, a method according to which dot recording of a single color is executed using the nozzle row 95, will be described. In addition, the head 7 of the case of the present embodiment has a structure that is provided with a first nozzle group 95a, in which a plurality of nozzles 73 that correspond to the first head 7a are arranged, a second nozzle group 95b, in which a plurality of nozzles 73 that correspond to the second head 7b are arranged, and a third nozzle group 95c, in which a plurality of nozzles 73 that correspond to the third head 7c are arranged, in the nozzle row 95. In addition, in the present embodiment, the nozzle pitch dp and a pixel pitch on printing paper P are equivalent.

Figure 4:
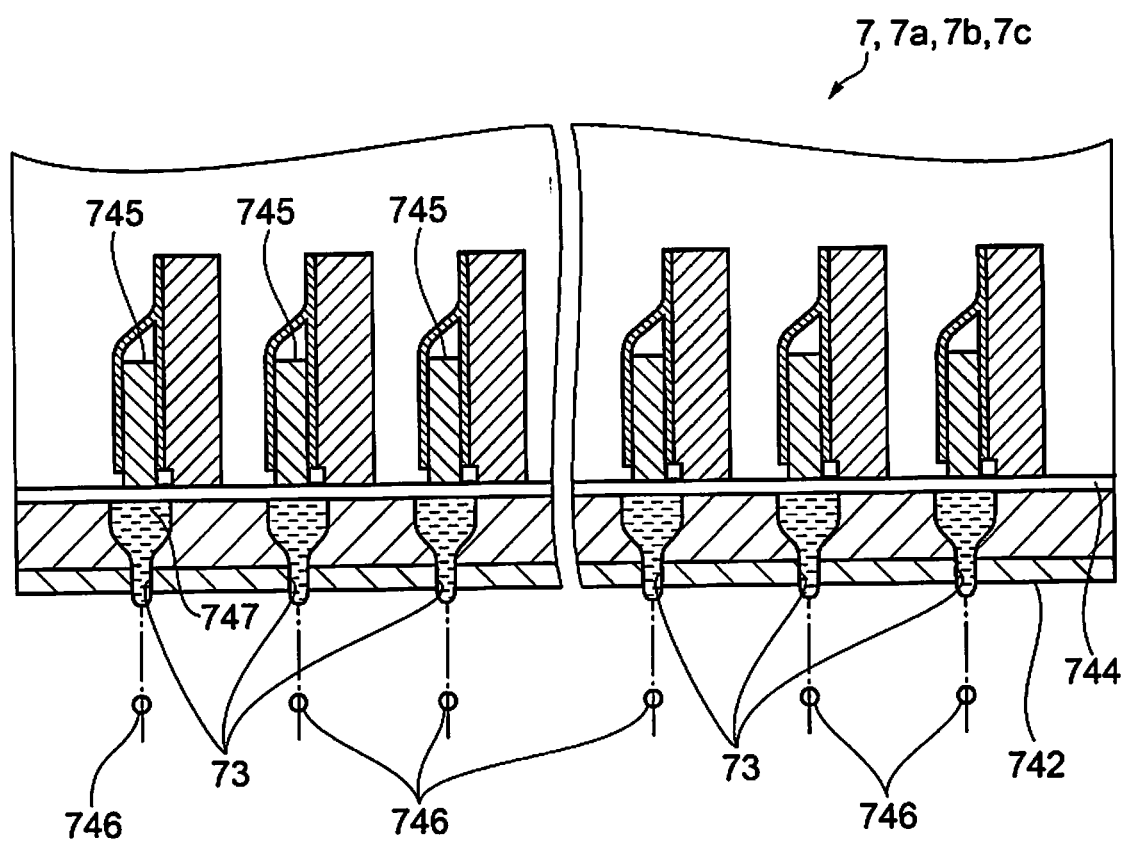
FIG. 4 is a cross-sectional view that shows a configuration of the head according to the first embodiment.

In addition, as shown in FIG. 4, each head 7 is provided with a nozzle plate 742, and the nozzles 73 are formed in the nozzle plate 742. Cavities 747, which are in communication with the nozzles 73, are formed in positions that are on the upper side (the +Z axis side) of the nozzle plate 742 and face the nozzles 73. Further, the ink, which is accumulated in the ink cartridge 60, is supplied to the cavities 747 of the head 7.

Vibration plates 744 that increase and decrease the capacities inside the cavities 747 as a result of vibrating in the up-down direction (the ±Z axis direction), and piezoelectric elements 745 that cause the vibration plates 744 to vibrate as a result of expanding and contracting in the up-down direction, are installed on the upper side (the +z axis side) of the cavity 747. The vibration plates 744 vibrate due to the piezoelectric elements 745 expanding and contracting in the up-down direction, and the cavities 747 are pressurized as a result of the vibration plates 744 causing the capacities inside the cavities 747 to increase and decrease. As a result of this, the pressure inside the cavities 747 fluctuates, and the ink supplied to the inside of the cavities 747 is discharged through the nozzles 73 as ink droplets 746. Additionally, in the present embodiment, a pressurization means that uses longitudinal vibration type piezoelectric elements 745 is illustrated by way of example, but the invention is not limited to this configuration. For example, flexural deformation type piezoelectric elements in which a lower electrode, a piezoelectric body layer, and an upper electrode are formed in a stacked manner, may also be used. In addition, a so-called static electricity actuator, or the like, that generates static electricity between a vibration plate and an electrode, and discharges ink droplets from a nozzle by deforming the vibration plate using electrostatic force, may also be used as a pressure generation means. Furthermore, a head having a configuration that generates bubbles inside a nozzle using a heating member, and discharges ink as ink droplets using the bubbles, may also be used.

When printing is performed, the printer control portion 51 moves the head 7 in the main scanning direction using the carriage 421 as a scanning means while discharging the ink toward printing paper P from the nozzles 73. This operation is referred to as a "pass". As a result of this, rows of dots (raster lines) formed along the main scanning direction, are printed on printing paper P. Subsequently, the printer control portion 51 transports printing paper P in the sub-scanning direction using the transport unit 41. As a result of the printer control portion 51 repeating the above-mentioned operation, raster lines are aligned in the sub-scanning direction of printing paper P, and an image is formed on printing paper P. In the present embodiment, a single raster line is formed using a plurality of passes as a result of transporting printing paper P in the sub-scanning direction at a width that is narrower than the width of the head 7 in the sub-scanning direction. This is referred to as n pass (n: integer), and an $n^{th}$ pass is referred to as "pass n".

Returning to FIGS. 1 and 2, the maintenance mechanism 43 is provided with a head cap 47, which is disposed in a maintenance position, and raises and lowers the head cap 47 in order to move the head cap 47 between a raised position in which capping of the head 7 is performed, and a lowered position that is separated from the head 7. The maintenance mechanism 43 is provided with an elevation motor 48 as a driving source.

In this instance, the head 7 performs a flushing operation as a result of being disposed in the maintenance position at regular intervals using the carriage unit 42. The flushing operation is an operation that discharges ink droplets toward the head cap 47 from the head 7, and a circumstance in which clogging of the nozzles 73 occurs due to the thickening of ink is prevented or suppressed as a result of the flushing operation being performed at regular intervals. In addition, the maintenance position is a standby position of the head 7, and when the printer 3 enters a standby state in which printing data is not being received, the head 7 is disposed in the maintenance position using the carriage unit 42. In the standby state, an ink nozzle surface of the head 7 is covered as a result of the head cap 47 being disposed in the raised position due to driving of the elevation motor 48. As a result of this, since the evaporation of water content of the ink from the ink nozzle surface is suppressed, thickening of the ink is suppressed.

The non-discharging nozzle detection mechanism 44 is a mechanism that detects non-discharging nozzles that have discharge faults in the head 7. A residual vibration detection circuit that detects residual vibrations inside the cavities 747, is provided in the non-discharging nozzle detection mechanism 44 of the present embodiment. The residual vibration detection circuit is a circuit that performs detection focusing on the fact that a residual vibration waveform in a non-discharging nozzle and a residual vibration waveform in a nozzle that is capable of discharging normally, are different. More specifically, a driving signal is applied to the piezoelectric elements 745 that correspond to each nozzle 73, and residual vibrations (to explain in more detail, free vibration of the vibration plates 744) are generated inside the cavities 747 after pressure fluctuation at this time. These residual vibrations that are generated are detected. In the present embodiment, a pulse period length (a vibration period length) of pulse data that is output in accordance with the residual vibrations, is acquired.

In addition, the printer 3 is provided with the printer control portion 51, and a communication portion 52, which makes communication between the computer 2 and the printer 3 possible, and the non-discharging nozzle detection mechanism 44 are connected to the printer control portion 51. In addition, the head 7, the transport motor 412, the carriage motor 422, the elevation motor 48, and a liquid crystal display panel 50 are connected to the printer control portion 51 via respective device drivers, which are not illustrated in the drawings.

The printer control portion 51 is provided with a non-discharging nozzle detection control portion 55, a printing control portion 56, and a printer notification portion 57. The printer control portion 51 replies to the inquiry from the printer driver 14, which is operated by the computer 2, with the status of the printer 3. A status that shows that the printer 3 is printing, a status that shows that an error such as ink depletion or paper depletion has been generated, and the like, are examples of statuses with which the printer control portion 51 replies.

After the power of the printer 3 is turned on, the non-discharging nozzle detection control portion 55 performs non-discharging nozzle detection operation control at a timing that is determined in advance. In the present embodiment, a non-discharging nozzle detection operation is performed by driving the non-discharging nozzle detection mechanism 44 for each pass. Further, pulse period length (vibration period length) data of pulse data that is transmitted from the non-discharging nozzle detection mechanism 44, is acquired. Further, whether or not each nozzle 73 is a non-discharging nozzle is determined on the basis of the acquired data. Further, nozzle information is acquired for non-discharging nozzles for which the presence of a discharge fault was detected. The nozzle information is configured from ink nozzle information, which is respectively assigned to each nozzle 73 that is arranged in each of the first to third heads 7a, 7b, and 7c.

Additionally, the timing of the non-discharging nozzle detection is not limited to every pass, and may be when the power of the printer 3 is turned on, when a printing job is finished, each time a fixed period elapses, or a timing in which these detection times are used in combination.

In addition, the non-discharging nozzle detection control portion 55 responds when there is an inquiry of whether or not there are non-discharging nozzles from the non-discharging nozzle information acquisition portion 21 of the printer driver 14, which is operated by the computer 2. That is, in a case in which the nozzle information of a non-discharging nozzle is acquired, the non-discharging nozzle detection control portion 55 transmits the corresponding nozzle information as the fact that there is a non-discharging nozzle, to the non-discharging nozzle information acquisition portion 21 via the communication portion 52. In a case in which nozzle information of a non-discharging nozzle is not acquired, the non-discharging nozzle detection control portion 55 transmits information that there is not a non-discharging nozzle to the non-discharging nozzle information acquisition portion 21.

When printing data or supplementing printing data is received via the communication portion 52, the printing control portion 56 performs a printing operation. That is, the printing control portion 56 carries out printing on printing paper P discharging ink droplets from each nozzle 73 on the basis of the printing data or the supplementing printing data as a result of driving the head 7, the transport unit 41, the carriage unit 42, and the like.

The printer notification portion 57 displays a printing status, and the like, on the liquid crystal display panel 50 during an interval in which the printing control portion 56 is performing printing of the printing data or the supplementing printing data.

Figure 5:
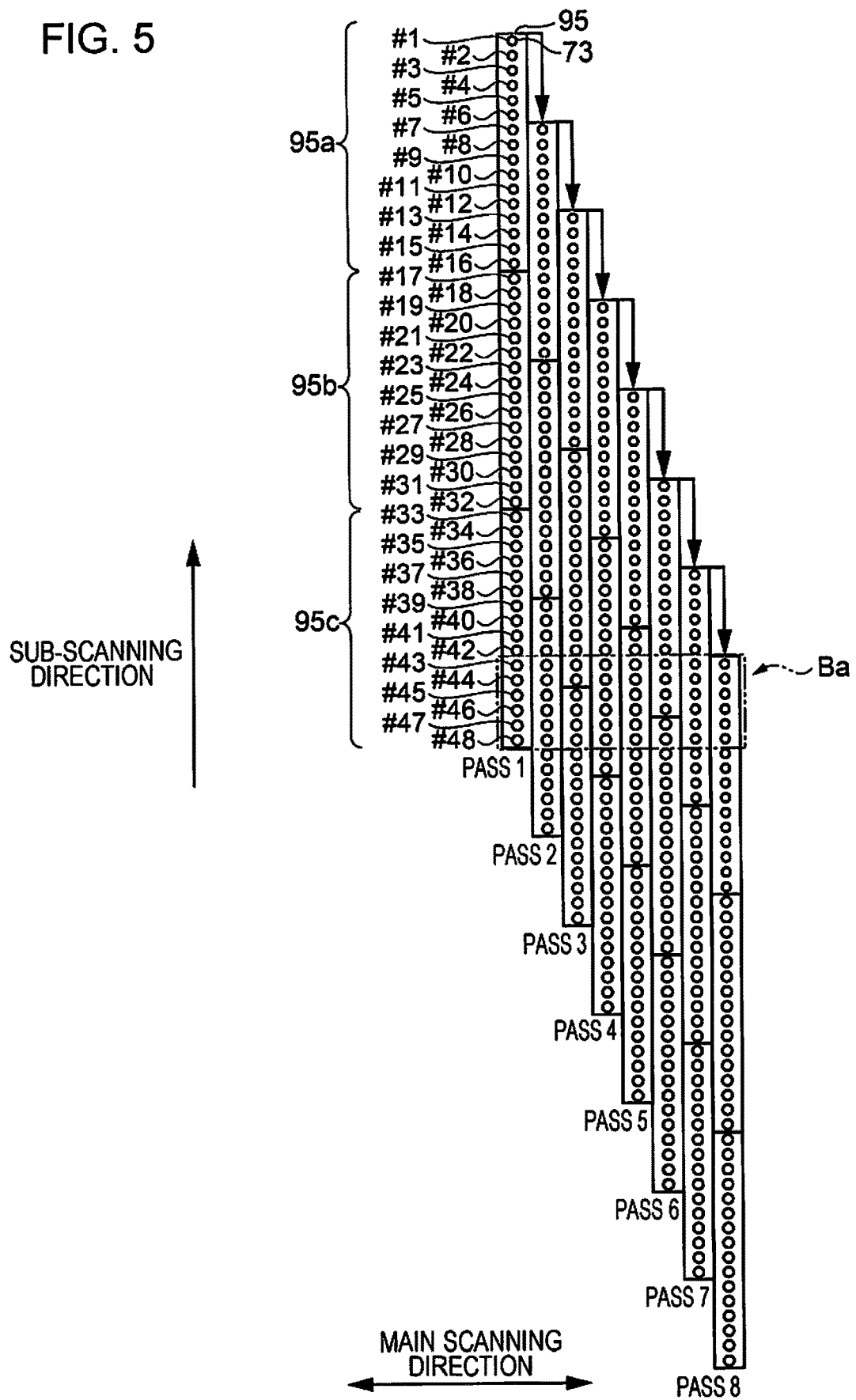
FIG. 5 is an explanatory view that shows a printing format according to the first embodiment.

Next, a printing format of the present embodiment will be described. FIG. 5 is an explanatory view that shows a printing format. More specifically, relative positional relationships of printing paper P and the virtual nozzle row 95 during each dot formation operation, are shown. Additionally, in the present embodiment, a case in which a plurality of raster lines are formed on a sheet of paper by discharging the ink from the first nozzle group 95a, the second nozzle group 95b, and the third nozzle group 95c, which correspond to each of the first to third heads 7a, 7b, and 7c, will be described.

In addition, in the present embodiment, as shown in FIG. 5, description will be given using the virtual nozzle row 95 (refer to FIG. 3), which is configured by the first nozzle group 95a, the second nozzle group 95b, and the third nozzle group 95c, as an example. Additionally, in order to simplify the description, the number of nozzles 73 of each of the first to third nozzle groups 95a, 95b, and 95c is set as 16. More specifically, a nozzle number of a nozzle 73 of the first nozzle group 95a that is furthest on an upstream side in the sub-scanning direction is written as #1, nozzle numbers are written in order along the downstream side in the sub-scanning direction of the first nozzle group 95a, and a nozzle number of a nozzle 73 of the first nozzle group 95a that is furthest on the downstream side in the sub-scanning direction is written as #16. In addition, a nozzle number of a nozzle 73 of the second nozzle group 95b that is furthest on the upstream side in the sub-scanning direction, which is disposed on the downstream side in the sub-scanning direction of the first nozzle group 95a, is written as #17, nozzle numbers are written in order along the downstream side in the sub-scanning direction of the second nozzle group 95b, and a nozzle number of a nozzle 73 of the second nozzle group 95b that is furthest on the downstream side in the sub-scanning direction is written as #32. In addition, a nozzle number of a nozzle 73 of the third nozzle group 95c that is furthest on the upstream side in the sub-scanning direction, which is disposed on the downstream side in the sub-scanning direction of the second nozzle group 95b, is written as #33, nozzle numbers are written in order along the downstream side in the sub-scanning direction of the third nozzle group 95c, and a nozzle number of a nozzle 73 of the third nozzle group 95c that is furthest on the downstream side in the sub-scanning direction is written as #48.

Further, the printer control portion 51 forms raster lines as a result of controlling the transport unit 41, the carriage unit 42, the head 7, and the like, on the basis of the printing data, and the like. At this time, raster lines are formed in accordance with a configuration proportion of pixel data that is stipulated for each nozzle 73 for each pass. Additionally, in the present embodiment, a case in which a raster line is formed with eight passes will be described.

In addition, FIG. 5 is drawn in a manner in which the nozzle row 95 moves with respect to a sheet of paper, but in an actual sense, the sheet of paper moves in the transport direction. In the present embodiment, in a transport operation that is performed between passes, a sheet of paper is transported in the sub-scanning direction so as to correspond to a transport amount corresponding to six dots. Further, a raster line (dots (an image)) is formed using pass 1 to pass 8. From this point onwards, dots (images) continue to be formed in the same manner using pass 2 to pass 9.

In this instance, the disposition of the nozzles 73 of each of the first to third nozzle groups 95a, 95b, and 95c in a band region Ba (refer to FIG. 5) according to the printing format of the present embodiment will be described. The band region Ba is a unit region of 6×8 pixels of an image that is formed in eight passes.

Figure 6:
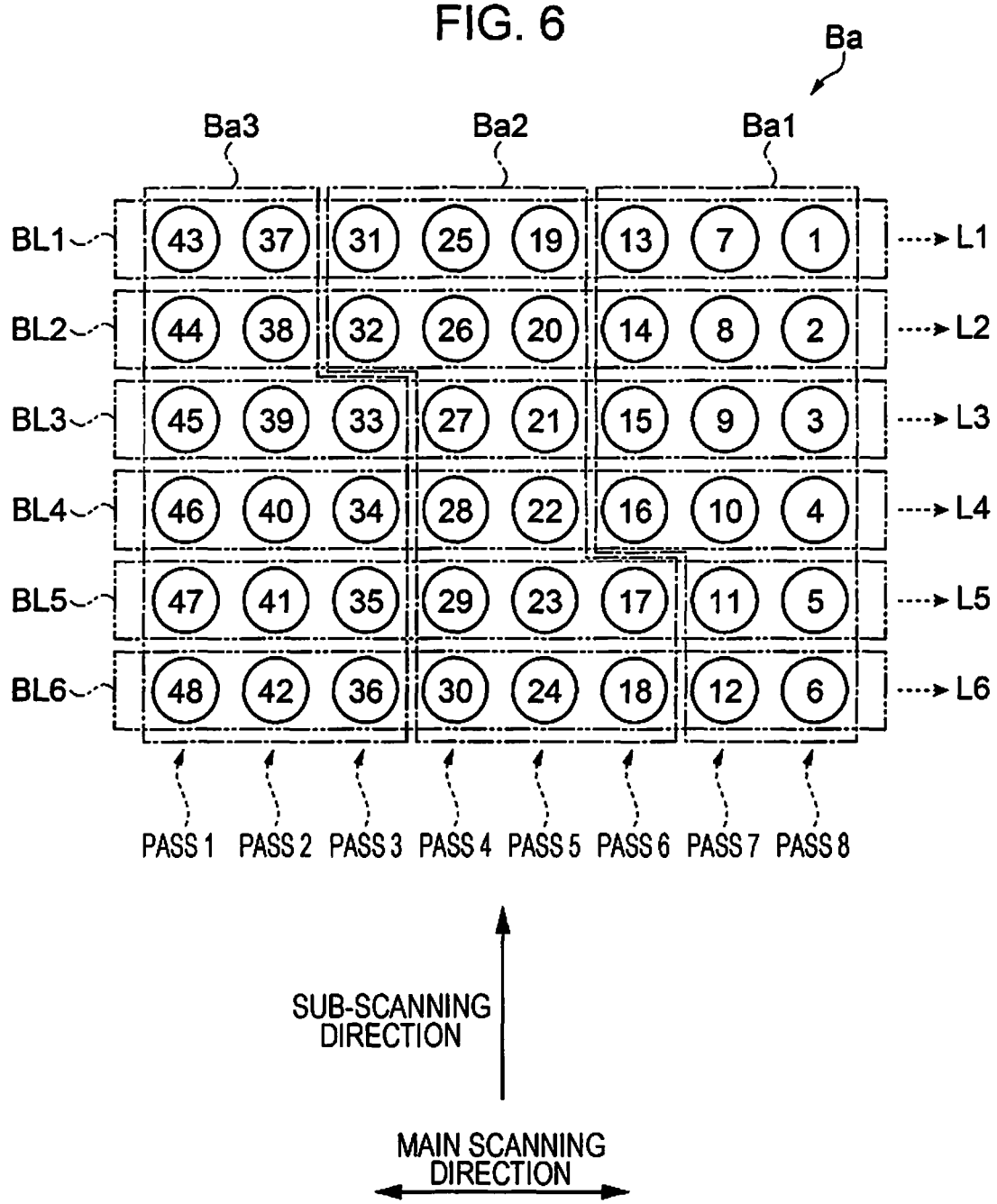
FIG. 6 is an explanatory view that shows corresponding nozzles in a band region according to the first embodiment.

FIG. 6 is an explanatory view that shows corresponding nozzles in a band region. As shown in FIG. 6, numbers (nozzle numbers #1 to #48) of the nozzles 73 of the first to third nozzle groups 95a, 95b, and 95c that correspond to the band region Ba are assigned.

As shown in FIGS. 5 and 6, the band region Ba is configured from a first band region Ba1 to which the nozzles 73 (nozzle numbers #1 to #16) of the first nozzle group 95a correspond, a second band region Ba2 to which the nozzles 73 (nozzle numbers #17 to #32) of the second nozzle group 95b correspond, and a third band region Ba3 to which the nozzles 73 (nozzle numbers #33 to #48) of the third nozzle group 95c correspond.

Further, a raster line L1 is associated with a first band line BL1 in the main scanning direction. In this instance, the first band line BL1 is sorted into the three nozzles 73 (nozzles #1, #7, and #13) of the first nozzle group 95a, the three nozzles 73 (nozzles #19, #25, and #31) of the second nozzle group 95b, and the two nozzles 73 (nozzles #37, and #43) of the third nozzle group 95c.

In addition, a raster line L2 is associated with a second band line BL2 in the main scanning direction. In this instance, the second band line BL2 is sorted into the three nozzles 73 (nozzles #2, #8, and #14) of the first nozzle group 95a, the three nozzles 73 (nozzles #20, #26, and #32) of the second nozzle group 95b, and the two nozzles 73 (nozzles #38, and #44) of the third nozzle group 95c.

In addition, a raster line L3 is associated with a third band line BL3 in the main scanning direction. In this instance, the third band line BL3 is sorted into the three nozzles 73 (nozzles #3, #9, and #15) of the first nozzle group 95a, the two nozzles 73 (nozzles #21, and #27) of the second nozzle group 95b, and the three nozzles 73 (nozzles #33, #39, and #45) of the third nozzle group 95c.

In addition, a raster line L4 is associated with a fourth band line BL4 in the main scanning direction. In this instance, the fourth band line BL4 is sorted into the three nozzles 73 (nozzles #4, #10, and #16) of the first nozzle group 95a, the two nozzles 73 (nozzles #22, and #28) of the second nozzle group 95b, and the three nozzles 73 (nozzles #34, #40, and #46) of the third nozzle group 95c.

In addition, a raster line L5 is associated with a fifth band line BL5 in the main scanning direction. In this instance, the fifth band line BL5 is sorted into the two nozzles 73 (nozzles #5, and #11) of the first nozzle group 95a, the three nozzles 73 (nozzles #17, #23, and #29) of the second nozzle group 95b, and the three nozzles 73 (nozzles #35, #41, and #47) of the third nozzle group 95c.

In addition, a raster line L6 is associated with a sixth band line BL6 in the main scanning direction. In this instance, the sixth band line BL6 is sorted into the two nozzles 73 (nozzles #6, and #12) of the first nozzle group 95a, the three nozzles 73 (nozzles #18, #24, and #30) of the second nozzle group 95b, and the three nozzles 73 (nozzles #36, #42, and #48) of the third nozzle group 95c.

Figure 7:
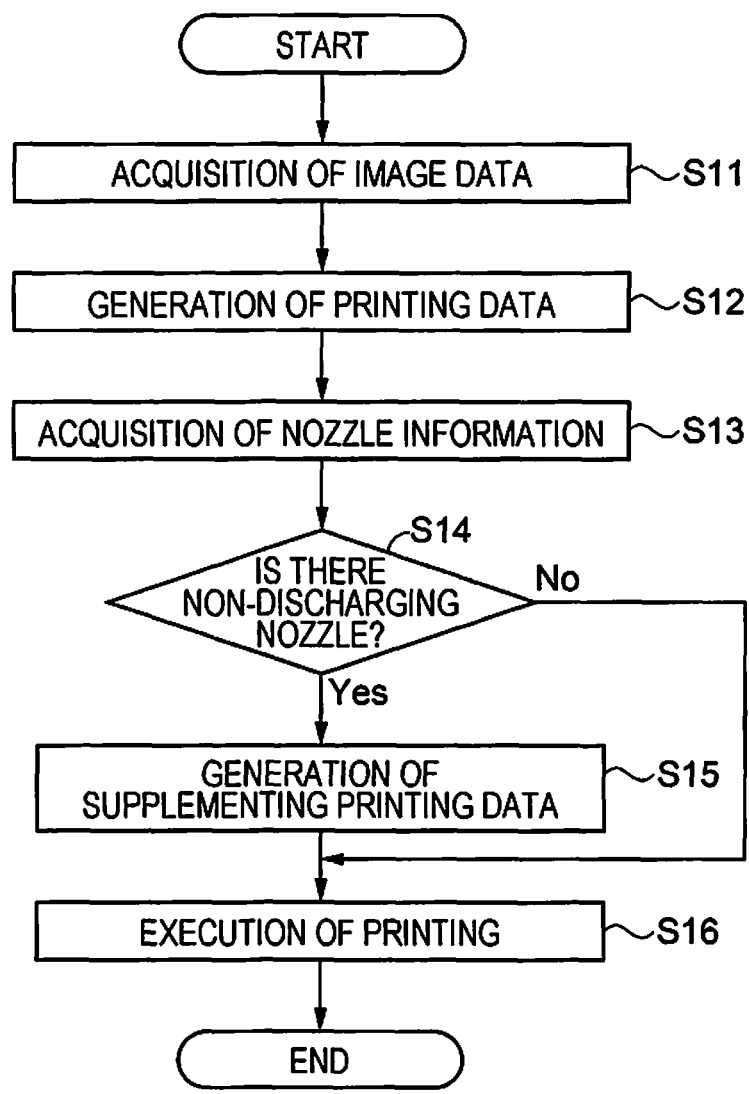
FIG. 7 is a flowchart that shows a liquid discharging method according to the first embodiment.
Figure 8:
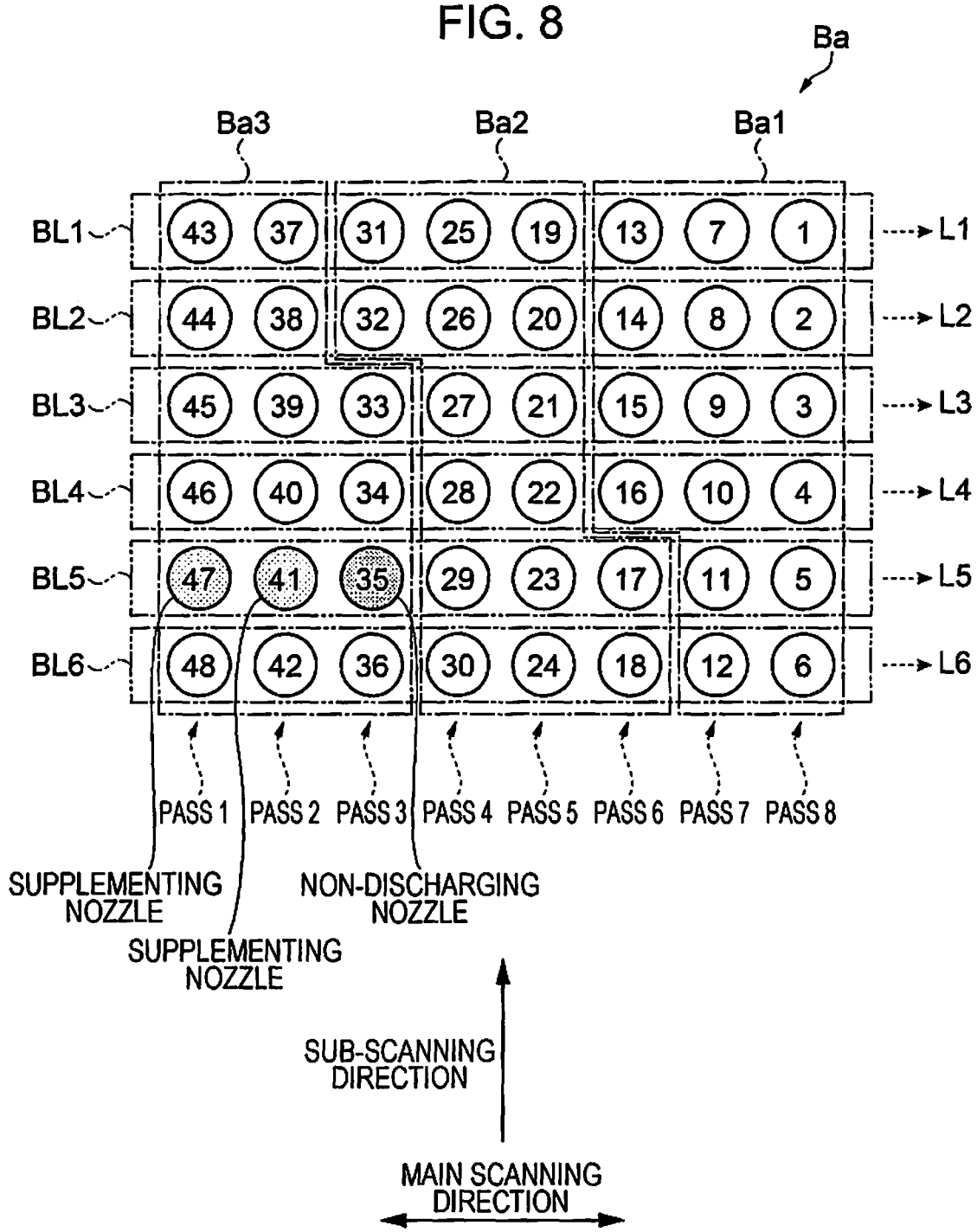
FIG. 8 is a schematic view that shows the liquid discharging method according to the first embodiment.
Figure 9:
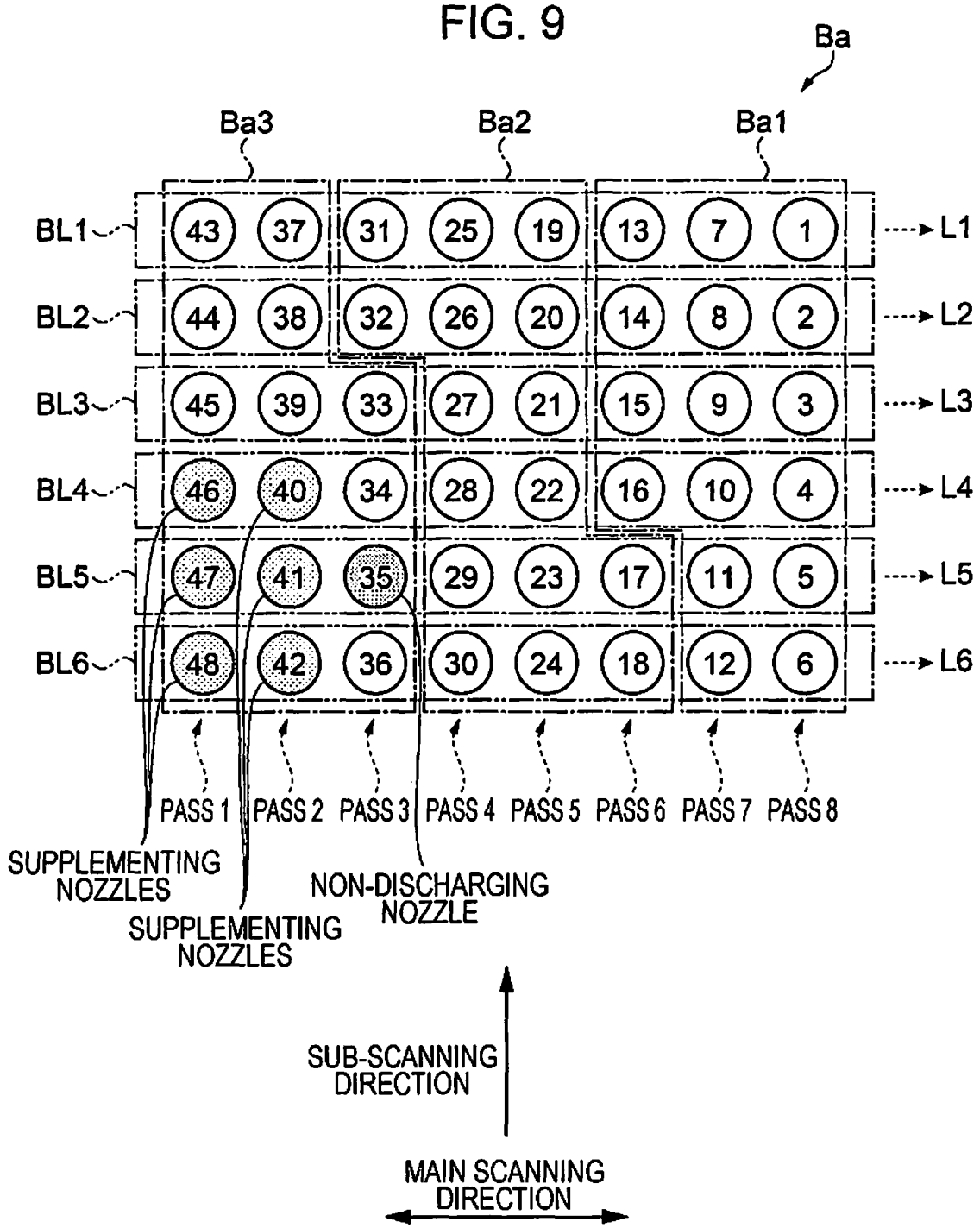
FIG. 9 is a schematic view that shows the liquid discharging method according to the first embodiment.

Next, a liquid discharging method will be described. The liquid discharging method of the present embodiment is a method that generates supplementing printing data, which corrects printing data in a manner in which it is possible to supplement with another nozzle within a predetermined nozzle group and executes a printing process on the basis of the supplementing printing data in a case in which it is determined that a predetermined nozzle within the predetermined nozzle group is a non-discharging nozzle when forming a plurality of raster lines on a medium by discharging a liquid from nozzles of a plurality of nozzle groups. Additionally, in the present embodiment, the liquid discharging method in the above-mentioned liquid discharging apparatus 1 will be described. FIG. 7 is a flowchart that shows a liquid discharging method, and FIGS. 8 and 9 are schematic views that describe the liquid discharging method.

As shown in FIG. 7, image data is acquired in Step S11. More specifically, the printer driver 14 receives image data from the application program 13 via the OS 12.

Subsequently, printing data is generated in Step S12. More specifically, the printer driver 14 generates printing data by converting the acquired image data into RGB multi-value data, ink quantity data of each color of ink, and dot ratio data.

Subsequently, nozzle information is acquired in Step S13. More specifically, the non-discharging nozzle detection mechanism 44 is driven, it is determined whether or not each nozzle is a non-discharging nozzle from the residual vibrations (the pulse period length (vibration period length) data of pulse data) of each nozzle, and the non-discharging nozzle information acquisition portion 21 acquires the result as nozzle information. Additionally, in the present embodiment, the nozzle information is acquired by driving the non-discharging nozzle detection mechanism 44 for each pass.

Subsequently, in Step S14, it is determined whether or not there is a non-discharging nozzle. Further, the process transitions to Step S15 in a case of (Yes) in a case in which there is a non-discharging nozzle, and the process transitions to Step S16 in a case of (No) in a case in which there is not a non-discharging nozzle.

In a case in which the process transitions to Step S15, supplementing printing data, which corrects the printing data is generated. More specifically, as shown in FIG. 8, for example, when it is determined that the nozzle 73 of nozzle number #35 is a non-discharging nozzle, a supplementing nozzle is selected giving priority to nozzles 73 of the same third nozzle group 95c as the third nozzle group 95c to which the non-discharging nozzle (nozzle number #35) belongs. In this case, selection as a supplementing nozzle is further performed giving priority to nozzles (either nozzle number #41 or nozzle number #47) that are nozzles 73 of the same third nozzle group 95c as the third nozzle group 95c to which the non-discharging nozzle (nozzle number #35) belongs and that correspond to the same raster line L5 as the raster line L5 that corresponds to the non-discharging nozzle (nozzle number #35). Additionally, in a case in which there are a plurality of the nozzles 73 according to the selection of supplementing nozzles, a supplementing nozzle is selected by assigning priority to a nozzle 73 that corresponds to a pass that is close to the pass to which the non-discharging nozzle (nozzle number #35) belongs. Accordingly, in the example of present embodiment, setting of the supplementing nozzle is performed giving priority to a nozzle 73 (nozzle number #41) that corresponds to pass 2, which is close to pass 3 to which the non-discharging nozzle (nozzle number #35) belongs, over a nozzle 73 (nozzle number #47) that corresponds to pass 1. Further, the configuration proportion of pixel data that corresponds to the non-discharging nozzle (nozzle number #35) is decreased, and a configuration proportion of pixel data of an amount corresponding to the decreased amount is distributed to the supplementing nozzle (nozzle number #41) on the basis of the nozzle information and the printing data.

Additionally, the nozzle 73 of nozzle number #41 and the nozzle 73 of nozzle number #47 may both be set as supplementing nozzles. In this case, the configuration proportion of pixel data that corresponds to the non-discharging nozzle (nozzle number #35) is decreased, and a configuration proportion of pixel data of an amount corresponding to the decreased amount may be respectively distributed to the plurality of supplementing nozzles (nozzle number #41 and nozzle number #47).

Furthermore, in the present embodiment, as shown in FIG. 9, other nozzles (nozzle numbers #40 and #46 that correspond to the raster line L4, and nozzle numbers #42 and #48 that correspond to the raster line L6) that are nozzles 73 of the same third nozzle group 95c as the third nozzle group 95c to which the non-discharging nozzle (nozzle number #35) belongs, and that correspond to the different raster lines L4 and L6 that are disposed in the periphery of the raster line L5 that corresponds to the non-discharging nozzle (nozzle number #35), are also set as supplementing nozzles. Further, the configuration proportion of pixel data that corresponds to the nozzle 73 (nozzle number #34) that corresponds to the raster line L4 in the periphery of the non-discharging nozzle (nozzle number #35) is decreased, and a configuration proportion of pixel data of an amount corresponding to the decreased amount is distributed to a nozzle 73 (either nozzle number #40 or nozzle number #46) that corresponds to the raster line L4. In the same manner, the configuration proportion of pixel data that corresponds to the nozzle 73 (nozzle number #36) that corresponds to the raster line L6 in the periphery of the non-discharging nozzle (nozzle number #35) is decreased, and a configuration proportion of pixel data of an amount corresponding to the decreased amount is distributed to a nozzle 73 (either nozzle number #42 or nozzle number #48) that corresponds to the raster line L6. Additionally, the selection of the supplementing nozzle may be the nozzle numbers #40 and #46 that correspond to the raster line L4 only, or may be the nozzle numbers #42 and #48 that correspond to the raster line L6 only.

Subsequently, printing is executed in Step S16. More specifically, the head 7, the transport unit 41, the carriage unit 42, and the like, are driven on the basis of the supplementing printing data. As a result of this, an image is formed on printing paper P.

On the other hand, in a case (No) in which it was determined in Step S14 that there is not a non-discharging nozzle, the process transitions to Step S16, and the head 7, the transport unit 41, the carriage unit 42, and the like, are driven on the basis of printing data. As a result of this, an image is formed on printing paper P.

According to the abovementioned embodiment that has been described above, it is possible to obtain the following effects.

In a case in which a non-discharging nozzle occurs, a non-discharging nozzle and a supplementing nozzle are nozzles within the same nozzle group. Accordingly, effects such as attachment error (alignment error) of the nozzle group are reduced, and therefore, variation in a landing position of the liquid with respect to the medium is suppressed, and it is possible to prevent deterioration in image quality.

In addition, in a case in which a non-discharging nozzle occurs, a nozzle that corresponds to the same raster line to which the non-discharging nozzle belongs is set as a supplementing nozzle. As a result of this, effects such as attachment error (alignment error) of the nozzle group are reduced, and furthermore, since variation in a landing position of the liquid with respect to the medium is suppressed, it is possible to prevent deterioration in image quality.

In addition, in a case in which a non-discharging nozzle occurs, in addition to supplementing with a nozzle that corresponds to the same raster line to which the non-discharging nozzle belongs, set as a supplementing nozzle, it is also possible to perform supplementing with nozzles that correspond to other raster lines in the periphery of the same raster line to which the non-discharging nozzle belongs. As a result of this, since supplementing is carried out using a plurality of raster lines, it is possible to make changes in the image quality in the periphery of a supplemented region, which is supplemented by the supplementing nozzles, more gradual, and therefore, it is possible to prevent deterioration in image quality.

Second Embodiment

Next, a second embodiment will be described. More specifically, in the first embodiment, a nozzle within the same nozzle group as a non-discharging nozzle is set as a supplementing nozzle, but in the present embodiment, a supplementing process method of a case in which it is not possible to select a supplementing nozzle using a nozzle within the same nozzle group as a non-discharging nozzle, will be described. Additionally, the basic configuration of the liquid discharging apparatus 1 is similar to that of the first embodiment, and therefore, description thereof will be omitted, and a section that differs from the first embodiment, that is, a liquid discharging method will be described.

Figure 10:
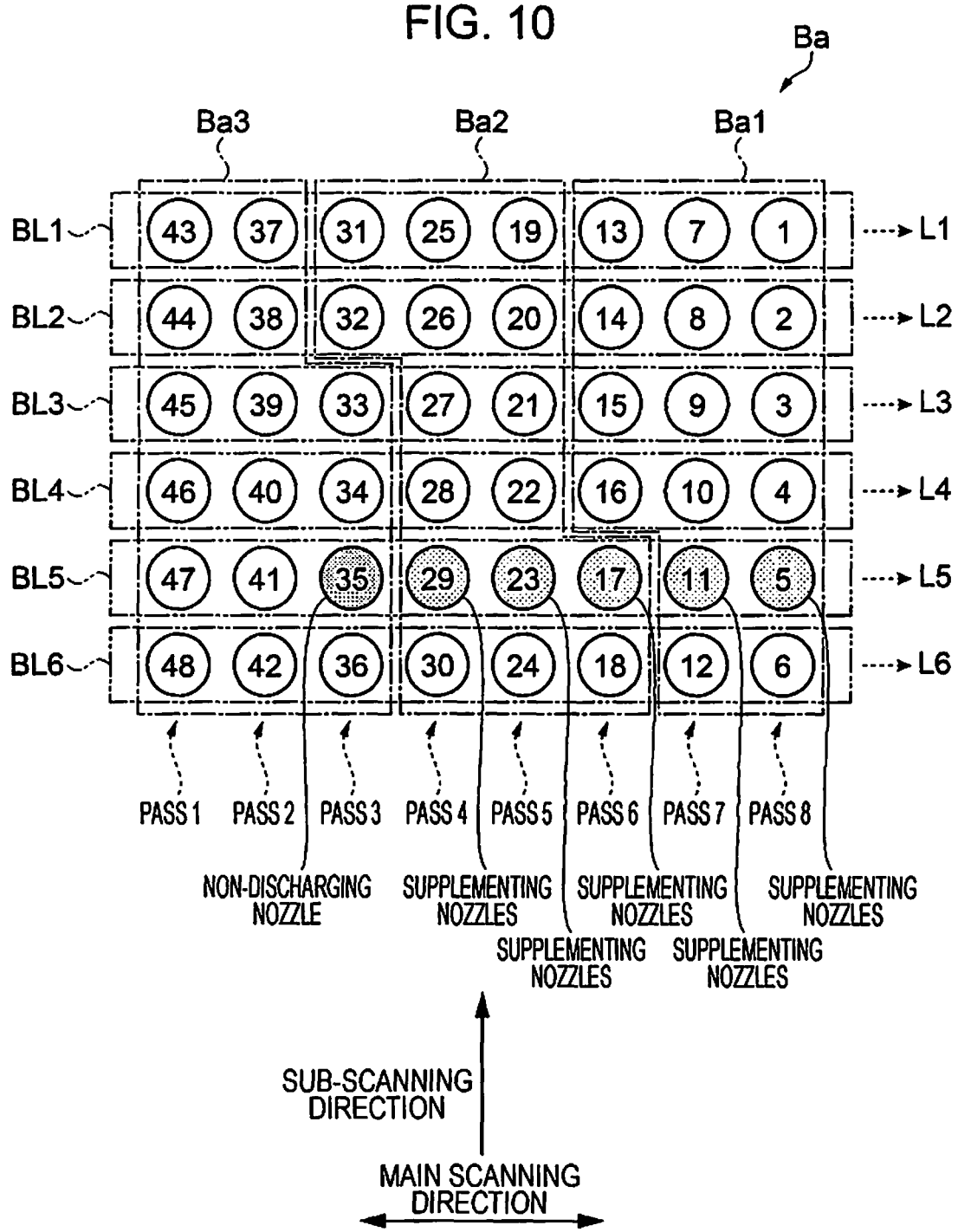
FIG. 10 is a schematic view that shows a liquid discharging method according to a second embodiment.

The liquid discharging method of the present embodiment is a method that generates supplementing printing data, which corrects printing data in a manner in which it is possible to supplement with a plurality of nozzles within another nozzle group that differs from the predetermined nozzle group and executes a printing process on the basis of the supplementing printing data when it is determined that it is not possible to supplement with the other nozzles within the predetermined nozzle group in a case in which it is determined that the predetermined nozzle within the predetermined nozzle group is a non-discharging nozzle. Hereinafter, description will be given with reference to FIGS. 7 and 10. Additionally, FIG. 10 is a schematic view that describes a liquid discharging method according to the present embodiment.

In addition, the processes of Steps S11 to Step S14 that are shown in FIG. 7 are similar to those of the first embodiment, and therefore, description thereof will be omitted.

For example, in Step S15 according to the present embodiment, when it is specified that the nozzle 73 of nozzle number #35 is a non-discharging nozzle, firstly, a supplementing nozzle is selected giving priority to nozzles 73 of the same third nozzle group 95c as the third nozzle group 95c to which the non-discharging nozzle (nozzle number #35) belongs.

However, in a case in which there are no candidates for the supplementing nozzle in the nozzles 73 of the same third nozzle group 95c as the third nozzle group 95c to which the non-discharging nozzle (nozzle number #35) belongs, a plurality of nozzles 73 that are included in the first nozzle group 95a or the second nozzle group 95b, which are different from the third nozzle group 95c, are selected as supplementing nozzles. In this instance, for example, a case in which there are no candidates for the supplementing nozzle in the nozzles 73 of the same third nozzle group 95c as the third nozzle group 95c to which the non-discharging nozzle (nozzle number #35) belongs, is a case in which the non-discharging nozzle (nozzle number #35) is detected after pass 2, a case in which a usage ratio of the nozzles 73 of the third nozzle group 95c to which the non-discharging nozzle (nozzle number #35) belongs is at an upper limit (for example, 100%) thereof, or the like. In such a case, since the supplementing process is not possible in the nozzles 73 of the same third nozzle group 95c as the third nozzle group 95c to which the non-discharging nozzle (nozzle number #35) belongs, the supplementing process is performed with nozzles 73 other than the third nozzle group 95c as a substitute process. Additionally, the above-mentioned process is executed by the supplementing process portion 26, and the like (refer to FIG. 1).

Further, in this case, as shown in FIG. 10, a plurality of nozzles 73 (nozzle number #5 and nozzle number #11 that correspond to the first nozzle group 95a, and nozzle number #17, nozzle number #23, and nozzle number #29 that correspond to the second nozzle group 95b) of the first and second nozzle groups 95a and 95b that correspond to the same raster line L5 as the raster line L5 that corresponds to the non-discharging nozzle (nozzle number #35), are selected as supplementing nozzle candidates, and ranking of these supplementing nozzle candidates is performed from the plurality of nozzles 73 that correspond to passes that are close to the pass to which the non-discharging nozzle (nozzle number #35) belongs. In the ranking of the example of the present embodiment, the order is a nozzle 73 (nozzle number #29) that corresponds to pass 4, which is close to pass 3 to which the non-discharging nozzle (nozzle number #35) belongs, followed by a nozzle 73 (nozzle number #23) that corresponds to pass 5, followed by a nozzle 73 (nozzle number #17) that corresponds to pass 6, followed by a nozzle 73 (nozzle number #11) that corresponds to pass 7, followed by a nozzle 73 (nozzle number #5) that corresponds to pass 8.

Further, the configuration proportion of the pixel data that corresponds to the non-discharging nozzle (nozzle number #35) is decreased on the basis of the nozzle information and the printing data, and a configuration proportion of pixel data of an amount corresponding to the decreased amount is distributed to the above-mentioned plurality of selected supplementing nozzles. The configuration proportion of pixel data at this time, is distributed so that a proportion of distribution decreases from the highest to the lowest ranking. Accordingly, the distribution proportion of the nozzle 73 (nozzle number #29) that corresponds to pass 4, which is closest to pass 3 to which the non-discharging nozzle (nozzle number #35) belongs, is the highest, and the distribution proportion of the nozzle 73 (nozzle number #5) that corresponds to pass 8, which is furthest from pass 3 to which the non-discharging nozzle (nozzle number #35) belongs, is the lowest.

Subsequently, the processes of Step S16 and onwards execute printing in the same manner as the first embodiment. As a result of this, an image is formed on printing paper P.

According to the abovementioned embodiment that has been described above, it is possible to obtain the following effects.

Even in a case in which the supplementing nozzles, which supplement a non-discharging nozzle, are in a nozzle group that differs from the nozzle group to which the non-discharging nozzle belongs, supplementing is carried out by the plurality of nozzles of the different nozzle group. As a result of this, since effects such as attachment error (alignment error) between nozzle groups are dispersed, it is possible to prevent deterioration in image quality.

Third Embodiment

Next, a third embodiment will be described. Additionally, the basic configuration and the printing format of a liquid discharging apparatus of the present embodiment are similar to those of the first embodiment, and therefore, description thereof (refer to FIGS. 1 to 6) will be omitted, and a section that differs from the first embodiment, that is, the configuration of a control portion will be described. FIGS. 11 to 14 are explanatory views that show configurations of a control portion.

A control portion 10a of a liquid discharging apparatus 1a of the present embodiment acquires a possible printing Duty of a predetermined band region (a predetermined nozzle group) on the basis of a number of occurrences of non-discharging nozzles in the predetermined band region (the first to third band regions Ba1, Ba2, and Ba3 (refer to FIG. 6)) that corresponds to the predetermined nozzle group (for example, the first to third nozzle groups 95a, 95b, and 95c (refer to FIGS. 3 and 5)), compares a set printing Duty that the predetermined nozzle group is to print among an overall printing Duty, and the possible printing Duty, and supplements the printing Duty with another band region that corresponds to another nozzle group in a case in which the possible printing Duty is smaller than the set printing Duty. Further, the supplementing printing data is generated based on the supplemented printing Duty.

As shown in FIG. 11, the possible printing Duty of a predetermined band region that corresponds to a predetermined nozzle group is a printing Duty that is stipulated in advance in each band region (the first band region Ba1, the second band region Ba2, and the third band region Ba3), and a printing Duty that corresponds to the number of occurrences of non-discharging nozzles is stipulated. The possible printing Duty is a value that stipulates the upper limit of the printing Duty.

More specifically, as shown in FIG. 11, the liquid discharging apparatus 1a is provided with items of table data TD1, TD2, and TD3 that show possible printing Duties. For example, the items of table data TD1, TD2, and TD3 are stored in the storage portion 11. The possible printing Duties of the first band region Ba1 are stipulated in the table data TD1. The table data TD1 includes number of occurrences of non-discharging nozzles, and the possible printing Duty that corresponds to the corresponding number of occurrences of non-discharging nozzles. To explain in more detail, in a case in which a non-discharging nozzle occurrence number is L1 (nozzles), the possible printing Duty is 100%. Additionally, the L1 (nozzles) of the non-discharging nozzle occurrence number may be a value that can have a given range (for example, from 0 to 10).

In addition, in a case in which a non-discharging nozzle occurrence number is L2 (nozzles), the possible printing Duty is 50%. Additionally, the L2 (nozzles) of the non-discharging nozzle occurrence number is a value that is larger than the L1 (nozzles) of the non-discharging nozzle occurrence number. In addition, the L2 (nozzles) of the non-discharging nozzle occurrence number may be a value that can have a given range (for example, from 11 to 20).

In a case in which a non-discharging nozzle occurrence number is L3 (nozzles), the possible printing Duty is 35%. Additionally, the L3 (nozzles) of the non-discharging nozzle occurrence number is a value that is larger than the L2 (nozzles) of the non-discharging nozzle occurrence number. In addition, the L3 (nozzles) of the non-discharging nozzle occurrence number may be a value that can have a given range (for example, from 21 to 40). In this manner, the value of the possible printing Duty is set so as to decrease as the non-discharging nozzle occurrence number increases. From this point onwards, possible printing Duties that correspond to non-discharging nozzle occurrence numbers L4, L5, . . . may also be stipulated in the same manner as above.

In addition, the non-discharging nozzle occurrence number and the possible printing Duties in the second band region Ba2 are stipulated in the table data TD2, and the non-discharging nozzle occurrence number and the possible printing Duties in the third band region Ba3 are stipulated in the table data TD3. Additionally, the items of table data TD2 and TD3 are similar to the table data TD1, and therefore, description thereof will be omitted.

In addition, the overall printing Duty is a sum total value of the set printing Duties of the band region Ba, and is a total value (an added value) of the respective set printing Duties of each of the first band region Ba1, the second band region Ba2, and the third band region Ba3. The set printing Duty is a printing Duty that is respectively associated with each band region (the first band region Ba1, the second band region Ba2, and the third band region Ba3). As shown in FIG. 12, in the example of the present embodiment, each band region (the first band region Ba1, the second band region Ba2, and the third band region Ba3) is stipulated at a set printing Duty of 50W. Accordingly, the overall printing Duty corresponds to a value (a total of 150%) obtained by adding together the set printing Duty (all 50%) of each band region (the first band region Ba1, the second band region Ba2, and the third band region Ba3). For example, the overall printing Duty and the set printing Duty are stored in the storage portion 11.

The number of occurrences of non-discharging nozzles in each band region (the first band region Ba1, the second band region Ba2, and the third band region Ba3) is calculated by the non-discharging nozzle detection control portion 55, and the calculated number of occurrences of non-discharging nozzles is acquired by the non-discharging nozzle information acquisition portion 21 via the communication portion 52 (refer to FIG. 1).

In the control portion 10a, the number of occurrences of non-discharging nozzles of each band region (the first band region Ba1, the second band region Ba2, and the third band region Ba3) is acquired, and a possible printing Duty that corresponds to the number of occurrences of non-discharging nozzles is acquired for each corresponding band region (the first band region Ba1, the second band region Ba2, and the third band region Ba3) from the items of table data TD that are shown in FIG. 11.

Additionally, in the present embodiment, a case in which the number of occurrences of non-discharging nozzles in the first band region Ba1 is L3 (nozzles), and the numbers of occurrences of non-discharging nozzles in the second and third band regions Ba2 and Ba3 are L1 (nozzles), will be described.

In this case, in the first band region Ba1, the possible printing Duty that corresponds to the number of occurrences of non-discharging nozzles being L3 (nozzles), is 35% (refer to FIG. 11). In such an instance, as shown in FIG. 13, in the control portion 10a, the possible printing Duty that corresponds to the number of occurrences of non-discharging nozzles in the first band region Ba1 being L3 is 35%. In addition, the possible printing Duties that correspond to the number of occurrences of non-discharging nozzles in the second and third band regions Ba2 and Ba3 being L1 are 100% (refer to FIG. 11).

Further, the set printing Duty (50% (refer to FIG. 12)) that the first band region Ba1 is to print among the overall printing Duty: 150%, and the acquired possible printing Duty (35% (refer to FIG. 13)) of the first band region Ba1, are compared. In the above-mentioned manner, the acquired possible printing Duty: 35% of the first band region Ba1 is smaller than the set printing Duty: 50%. In this case, supplementing of the printing Duty is performed with the other second and third band regions Ba2 and Ba3. More specifically, a difference in printing Duty: 15% (50%–35%) between the acquired possible printing Duty: 35% of the first band region Ba1 and the set printing Duty 50% is supplemented with (the difference is distributed to) the second and third band regions Ba2 and Ba3.

In the present embodiment, the difference in printing Duty is distributed to the second and third band regions Ba2 and Ba3 in an equal manner. More specifically, the difference in printing Duty: 15% is halved, and the halved printing Duties: 7.5% are supplemented with (the printing Duties are distributed to) the second and third band regions Ba2 and Ba3. As a result of this, as shown in FIG. 13, a printing Duty: 57.5% (50%+7.5%) after supplementing is set in the second band region Ba2. In the same manner, a printing Duty: 57.5% (50%+7.5%) after supplementing is set in the third band region Ba3. Accordingly, the total value (the overall printing Duty after supplementing) of the printing Duties after supplementing is 150%, and is the same value as the overall printing Duty that is set in advance (refer to FIG. 12).

Further, in the control portion 10a, the supplementing printing data is generated on the basis of the supplemented printing Duties, and the printing process is executed on the basis of the supplementing printing data.

On the other hand, the control portion 10a is configured to output an error in a case in which the total value of the possible printing Duties of the predetermined band region and the other band regions is smaller than the overall printing Duty.

More specifically, as shown in FIG. 14, for example, when the possible printing Duty in each of the first to third band regions Ba1, Ba2, and Ba3 is acquired on the basis of the number of occurrences of non-discharging nozzles in each of the first to third band regions Ba1, Ba2, and Ba3, in a case in which the numbers of occurrences of non-discharging nozzles in all of the first to third band regions Ba1, Ba2, and Ba3 is L3, and the possible printing Duty that corresponds to the number of occurrences of non-discharging nozzles being L3, are 35%, the total value of the printing Duties after supplementing is 105% (35%+35%+35%), and does not satisfy the overall printing Duty: 150% that is set in advance. In a case of not satisfying the overall printing Duty, there is a concern of deterioration in image quality. Therefore, in a case of not satisfying the overall printing Duty: 150%, an error is output.

Additionally, the means of outputting the error is not particularly limited. For example, an error display may be output to the display 4 of the computer 2 or the liquid crystal display panel 50 of the printer 3, or an alarm unit or a lamp, or the like, may be used. As a result of this, it is possible to easily encourage a user to perform replacement of the head 7.

Figure 15:
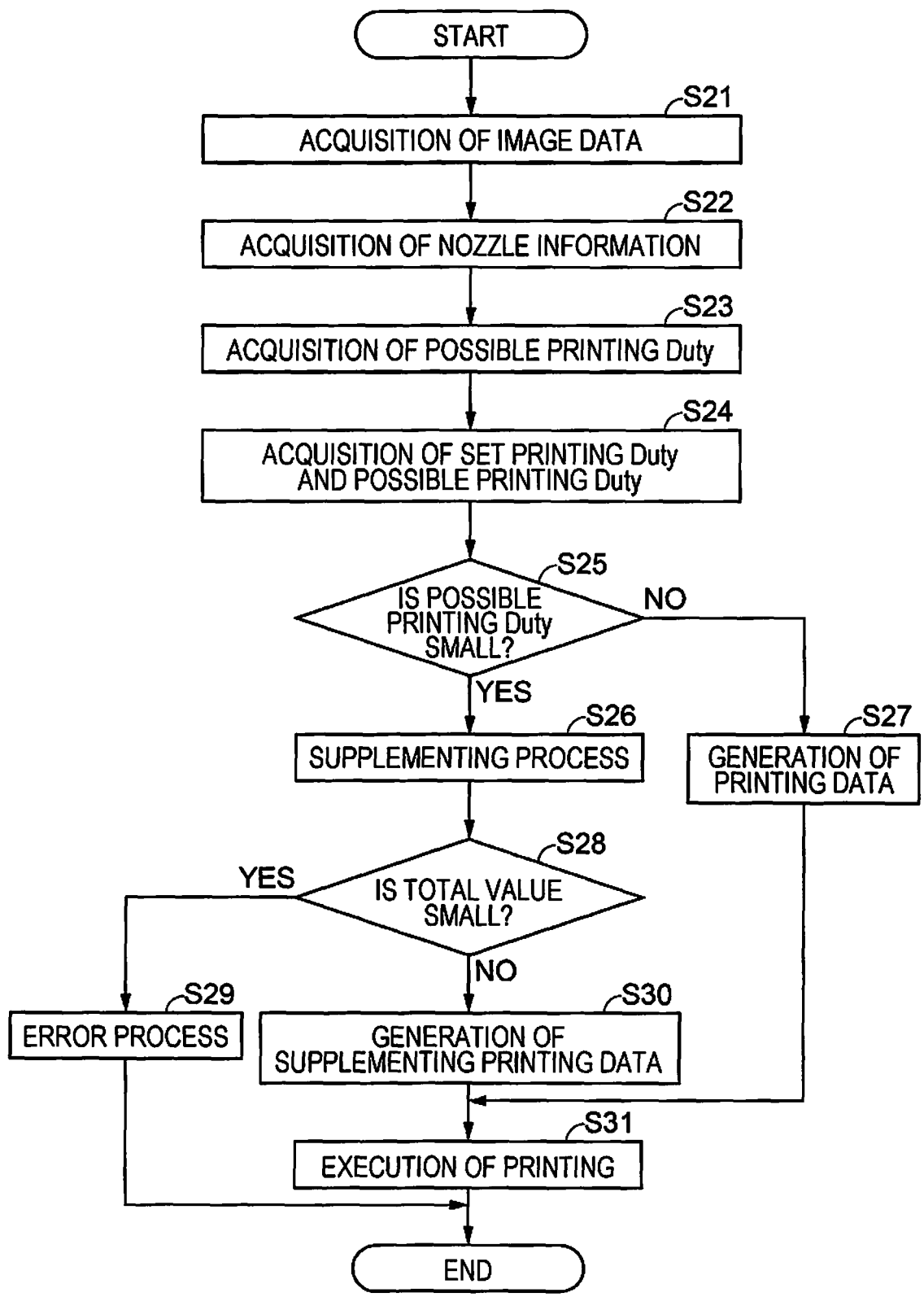
FIG. 15 is a flowchart that shows a liquid discharging method according to the third embodiment.

Next, a liquid discharging method will be described. Additionally, in the present embodiment, the liquid discharging method in the liquid discharging apparatus 1a will be described. FIG. 15 is a flowchart that shows a liquid discharging method.

As shown in FIG. 15, image data is acquired in Step S21. More specifically, the printer driver 14 receives image data from the application program 13 via the OS 12.

Subsequently, nozzle information is acquired in Step S22. More specifically, the non-discharging nozzle detection mechanism 44 is driven, it is determined whether or not each nozzle is a non-discharging nozzle from the residual vibrations (the pulse period length (vibration period length) data of pulse data) of each nozzle 73, and the number of occurrences of non-discharging nozzles in each band region (each nozzle group) is calculated. Further, the non-discharging nozzle information acquisition portion 21 acquires the calculation results of the number of occurrences of non-discharging nozzles as nozzle information.

Subsequently, in Step S23, the possible printing Duty of a predetermined band region (a predetermined nozzle group) is acquired on the basis of the number of occurrences of non-discharging nozzles in the predetermined band region (the predetermined nozzle group) acquired by the non-discharging nozzle information acquisition portion 21.

Additionally, in the present embodiment, a case in which the number of occurrences of non-discharging nozzles in the first band region Ba1 as the predetermined nozzle group (the predetermined band region), is L3 (nozzles), and the numbers of occurrences of non-discharging nozzles in the second and third band regions Ba2 and Ba3 as the other nozzle groups (the other band regions), are L1 (nozzles), and the overall printing Duty is 150% (refer to FIGS. 12 and 13).

In this case, referring to the table data TD (refer to FIG. 11), the possible printing Duty in the first band region Ba1 is a possible printing Duty of 35%, which corresponds to the number of occurrences of non-discharging nozzles being L3 (refer to FIG. 13). In addition, the respective possible printing Duties of the second and third band regions Ba2 and Ba3 are possible printing Duties of 100%, which correspond to the numbers of occurrences of non-discharging nozzles being L1.

Subsequently, in Step S24, the set printing Duty that the predetermined band region (the predetermined nozzle group) is to print among the overall printing Duty, and the possible printing Duty are compared. More specifically, the set printing Duty: 50% that the first band region Ba1 is to print among the overall printing Duty: 150%, and the possible printing Duty: 35% that is acquired in Step S23, are compared.

Subsequently, in Step S25, it is determined whether or not the possible printing Duty is smaller than the set printing Duty. As shown in the present embodiment, the process transitions to Step S26 in a case (YES) in which the possible printing Duty: 35% is smaller than the set printing Duty: 50%.

On the other hand, the process transitions to Step S27 in a case (NO) in which the possible printing Duty is not smaller than the set printing Duty, that is, in a case in which the acquired possible printing Duty is a value that is the set printing Duty or more.

printing data is generated in Step S27. More specifically, a halftone process is carried out on the basis of the possible printing Duty that is acquired in the printer driver 14, and printing data of a format that the printer 3 is capable of interpreting is generated.

Thereafter, the process transitions to Step S31, and printing is executed. More specifically, the head 7, the transport unit 41, the carriage unit 42, and the like, are driven on the basis of the printing data. As a result of this, an image is formed on printing paper P.

In addition, in a case in which the process transitions to Step S26, the printing Duty is supplemented with the other band regions Ba (the second and third band regions Ba2 and Ba3). More specifically, a difference in printing Duty: 15% (50%-35%) between the acquired possible printing Duty: 35% of the first band region Ba1 and the set printing Duty 50% that was originally set is supplemented with (the difference is distributed to) the second and third band regions Ba2 and Ba3.

In the present embodiment, the difference in printing Duty is distributed to the second and third band regions Ba2 and Ba3 in an equal manner. More specifically, the difference in printing Duty: 15% is halved, and the halved printing Duties: 7.5% are respectively supplemented with (the printing Duties are distributed to) the second and third band regions Ba2 and Ba3.

As a result of this, as shown in FIG. 13, the printing Duty in the first band region Ba1 is 35%, the printing Duty after supplementing in the second band region Ba2 is set to 57.5%, and the printing Duty after supplementing in the third band region Ba3 is set to 57.5%. In addition, the overall printing Duty, which corresponds to the total value of the printing Duty after supplementing, is 150%, and is the same value as the overall printing Duty that is set in advance (refer to FIG. 12).

Subsequently, in Step S28, it is determined whether or not the total value of the possible printing Duties of the first band region Ba1, the second and the third band region Ba2 and Ba3 is smaller than the overall printing Duty. More specifically, as shown in the present embodiment, the total value (printing Duty: 150%) of the possible printing Duties of the first band region Ba1, and the second and third band regions Ba2 and Ba3 is the same value as the overall printing Duty: 150%, and the process transitions to Step S30 in a case in which the value is not smaller (NO).

On the other hand, the process transitions to Step S29 in a case (YES) in which the total value of the possible printing Duties of the first band region Ba1, and the second and third band regions Ba2 and Ba3 is smaller than the overall printing Duty. Further, an error process is carried out in Step S29.

In this instance, a case in which the total value of the possible printing Duties of the first band region Ba1, and the second and third band regions Ba2 and Ba3 is smaller than the overall printing Duty is a case in which, for example, as shown in FIG. 14, when the possible printing Duty in each of the first to third band regions Ba1, Ba2, and Ba3 is acquired on the basis of the number of occurrences of non-discharging nozzles in each of the first to third band regions Ba1, Ba2, and Ba3, the numbers of occurrences of non-discharging nozzles in all of the first to third band regions Ba1, Ba2, and Ba3 is L3, and the possible printing Duty that corresponds to the number of occurrences of non-discharging nozzles being L3, is 35%, the total value of the printing Duties after supplementing is 105% (35%+35%+35%), and does not satisfy the overall printing Duty: 150% that is set in advance.

Furthermore, in addition to the above, the same state as the above may occur in a case in which a large number of non-discharging nozzles are generated in the other band regions other than the predetermined band region, and it is not possible to supplement the printing Duty.

The error process in Step S29 displays an error on the display 4. As a result of this, it is possible for a user to efficiently perform replacement of the head 7 by confirming the display content of the display 4. Additionally, the manner of the error process is not particularly limited. In addition to the above, an error display may be output to the liquid crystal display panel 50 of the printer 3, or an alarm unit or a lamp, or the like, may be used.

In addition, supplementing printing data is generated in a case in which the process transitions to Step S30. More specifically, a halftone process is carried out on the basis of the printing Duty that is supplemented and processed in the printer driver 14, and supplementing printing data of a format that the printer 3 is capable of interpreting is generated.

Thereafter, the process transitions to Step S31, and the head 7, the transport unit 41, the carriage unit 42, and the like, are driven on the basis of the supplementing printing data. As a result of this, an image is formed on printing paper P.

According to the abovementioned embodiment that has been described above, it is possible to obtain the following effects.

(1) Even in a case in which the number of occurrences of non-discharging nozzles in the first band region Ba1 is comparatively high, the difference in printing Duty is supplemented with the second and third band regions Ba2 and Ba3. As a result of this, effects on the image are reduced, and therefore, it is possible to suppress deterioration in the quality of an overall image.

(2) When the difference in printing Duty is supplemented with the second and third band regions Ba2 and Ba3, since the difference is respectively distributed to the second and third band regions Ba2 and Ba3 in an equal manner, the control process is easy, and it is possible to suppress deterioration in the quality of the overall image.

(3) An error process is carried out in a case in which the total value of the possible printing Duties of the first band region Ba1, and the second and third band regions Ba2 and Ba3 is smaller than the overall printing Duty. Therefore, it is possible to preemptively prevent the generation of deterioration in the quality of an overall image. In addition, as a result of the error process, it is possible to encourage a user to perform head replacement.

Additionally, the invention is not limited to the abovementioned embodiments, and it is possible to apply various changes, improvements, and the like, to the above-mentioned embodiments. Modification examples will be mentioned below.

Modification Example 1

In the above-mentioned embodiments, a configuration provided with a plurality of heads 7, is used, but the invention is not limited to this configuration. For example, there may be a single head. In this case, it is sufficient as long as a first nozzle group and a second nozzle group are configured with respect to a nozzle row that is configured by a plurality of nozzles provided in a single head. That is, a configuration that is provided with a plurality of nozzle groups, and that forms each raster line with a number of passes that is the corresponding nozzle group number, or more, may also be used. It is also possible to obtain the same effects as above in this manner. In addition, there may be four or more heads. It is also possible to obtain the same effects as above in this manner.

Modification Example 2

In the liquid discharging methods (the formation process methods of images) in the above-mentioned embodiments, each raster line L (L1 to L6) is applied to a multi-pass recording method (Full POL) that is configured by each nozzle group 95a, 95b, and 95c only partially overlapping (POL) with one another in a plurality of passes (8 passes), but the invention is not limited to this configuration; and a multi-pass recording method that includes partial overlap (POL), may also be used. It is also possible to obtain the same effects as above in this manner.

Modification Example 3

In the above-mentioned embodiments, the non-discharging nozzle detection mechanism 44 has a configuration that detects residual vibrations within the cavities 747, but is not limited to this configuration. For example, the non-discharging nozzle detection mechanism may be provided with a current sensor that detects changes in current that are generated in an ink absorbing material that is accommodated inside the head cap, and detection of non-discharging nozzles may be performed on the basis of the changes in current that occur when ink droplets land on the ink absorbing material. Furthermore, the non-discharging nozzle detection mechanism may have a configuration that detects non-discharging nozzles by detecting the discharge of ink droplets from each nozzle 73 using optical means such as a laser. It is also possible to obtain the same effects as above in this manner.

Modification Example 4

In the third embodiment, in a case in which the acquired possible printing Duty of the first band region Ba1 is smaller than the set printing Duty, the printing Duty is respectively supplemented with the other second and third band regions Ba2 and Ba3 in an equal manner, but the invention is not limited to this configuration. The printing Duty may be respectively supplemented with the second and third band regions Ba2 and Ba3 at different proportions. For example, supplementing may be performed by changing the proportion depending on the respective numbers of occurrences of non-discharging nozzles of the second and third band regions Ba2 and Ba3. Additionally, supplementing may be performed in a manner that does not exceed the possible printing Duties that correspond to the number of occurrences of non-discharging nozzles of each of the second and third band regions Ba2 and Ba3. It is also possible to obtain the same effects as above in this manner.

Modification Example 5

A configuration in which the above-mentioned first embodiment, second embodiment, and third embodiment are used in combination, may also be used. More specifically, a case of implementing the first embodiment and the second embodiment, and a case of implementing the third embodiment may be divided depending on the number of occurrences of non-discharging nozzles.

To explain in more detail, in a case in which the number of occurrences of non-discharging nozzles in a predetermined band region that corresponds to a predetermined nozzle group is a predetermined number or less, supplementing printing data, which corrects printing data in a manner in which it is possible to supplement with nozzles other than the non-discharging nozzle, which are within the predetermined band region, is generated and the printing process is executed on the basis of the supplementing printing data (refer to FIGS. 8 to 10).

On the other hand, in a case in which the number of occurrences of non-discharging nozzles in a predetermined band region that corresponds to a predetermined nozzle group exceeds the predetermined number, a possible printing Duty of a predetermined band region is acquired on the basis of a number of occurrences of non-discharging nozzles in the predetermined band region, a set printing Duty that the predetermined band region is to print among an overall printing Duty is compared with the possible printing Duty, the supplementing process, which supplements the printing Duty with other band regions is executed in a case in which the possible printing Duty is smaller than the set printing Duty, and supplementing printing data based on the supplemented and processed printing Duties, are generated. Further, the printing process is executed on the basis of the supplementing printing data (refer to FIGS. 11 to 14).

Additionally, it is preferable that the predetermined number of the number of occurrences of non-discharging nozzles be a number of non-discharging nozzles that corresponds to a possible printing Duty that corresponds to a set printing Duty of each band region (refer to FIG. 12). For example, in the above-mentioned embodiment, the set printing Duty of the first band region Ba1 is set to 50%, and since the possible printing Duty is 50% as long as the number of non-discharging nozzles is L2 (nozzles), as long as the number of non-discharging nozzles is L2 (nozzles) or less, supplementing printing data, which corrects the printing data in a manner in which it is possible to supplement with nozzles other than the non-discharging nozzle is generated. On the other hand, in a case in which the number of non-discharging nozzles exceeds L2 (nozzles), for example, in a case in which the number of occurrences of non-discharging nozzles in the first band region Ba1 is L3 (nozzles), since the possible printing Duty is 35%, the 50% of the set printing Duty that is set in the first band region Ba1 is not satisfied. Accordingly, in this case, the printing Duty is supplemented with the other second and third band regions Ba2 and Ba3.

If such a configuration is used, a suitable supplementing process is executed depending on the number of occurrences of non-discharging nozzles. As a result of this, it is possible to suppress deterioration in the quality of an overall image.

This application claims priority under 35 U.S.C. 119 to Japanese Patent Application No. 2016-000398, filed Jan. 5, 2016 and NO. 2016-204926, filed Oct. 19, 2016. The entire disclosure of Japanese Patent Application No. 2016-000398 and No. 2016-204926 is hereby incorporated herein by reference.

What is claimed is:

1. A liquid discharging apparatus comprising:
a plurality of nozzle groups in which nozzles are arranged, and configured and arranged to discharge a liquid of the same color onto a medium to form a plurality of raster lines of the same color on the medium;
a main scanning portion that scans the plurality of nozzle groups in a main scanning direction;
a sub-scanning portion that relatively moves the plurality of nozzle groups and the medium in a sub-scanning direction, which intersects the main scanning direction, to perform multi-pass recording in which each of the plurality of raster lines is formed using a plurality of passes as a result of transporting the medium in the sub-scanning direction; and
a control portion,
wherein, upon determining that a predetermined nozzle within a predetermined nozzle group is a non-discharging nozzle, the control portion generates supplementing printing data, which corrects printing data so that the non-discharging nozzle is supplemented with supplementing nozzles within the predetermined nozzle group, which differ from the non-discharging nozzle, in a different pass from the non-discharging nozzle and executes a printing process on the basis of the supplementing printing data, and
wherein the control portion prioritizes nozzles within the predetermined nozzle group, which differ from the non-discharging nozzle, at least one of the nozzles corresponding to the same raster line as a raster line that corresponds to the non-discharging nozzle and at least one of the nozzles corresponding to a different raster line that is disposed in the periphery of the raster line that corresponds to the non-discharging nozzle, over a nozzle outside the predetermined nozzle group and selects the nozzles within the predetermined nozzle group as the supplementing nozzles.

2. The liquid discharging apparatus according to claim 1, wherein, upon determining that the predetermined nozzle within the predetermined nozzle group is a non-discharging nozzle, when it is determined that it is not possible to supplement with other nozzles that differ from the non-discharging nozzle within the predetermined nozzle group, the control portion generates supplementing printing data so that the non-discharging nozzle is supplemented with a plurality of supplementing nozzles within another nozzle group that differs from the predetermined nozzle group and executes the printing process on the basis of the supplementing printing data.

3. The liquid discharging apparatus according to claim 1, wherein, the control portion prioritizes a nozzle within the predetermined nozzle group, whose pass is closer to a pass that corresponds to the non-discharging nozzle, over a nozzle within the predetermined nozzle group, whose pass is farther away from the pass that corresponds to the non-discharging nozzle, and selects the nozzle whose pass is closer as one of the supplementing nozzles.

4. The liquid discharging apparatus according to claim 1, wherein, in a case in which there are no candidates for the supplementing nozzles within the predetermined nozzle group, the control portion prioritizes a nozzle outside the predetermined nozzle group, which corresponds to the same raster line as a raster line that corresponds to the non-discharging nozzle, over a nozzle outside the predetermined nozzle group, which corresponds to a different raster line from the raster line that corresponds to the non-discharging nozzle, and selects the nozzle corresponding to the same raster line as the supplementing nozzle.

5. A liquid discharging method of a liquid discharging apparatus provided with a plurality of nozzle groups in which nozzles are arranged, and configured and arranged to discharge a liquid of the same color onto a medium to form a plurality of raster lines of the same color on the medium, a main scanning portion that scans the plurality of nozzle groups in a main scanning direction, a sub-scanning portion that relatively moves the plurality of nozzle groups and the medium in a sub-scanning direction, which intersects the main scanning direction, to perform multi-pass recording in which each of the plurality of raster lines is formed using a plurality of passes as a result of transporting the medium in the sub-scanning direction, and a control portion, the method comprising, upon determining that a predetermined nozzle within a predetermined nozzle group is a non-discharging nozzle, generating supplementing printing data, which corrects printing data so that the non-discharging nozzle is supplemented with supplementing nozzles within the predetermined nozzle group, which differ from the non-discharging nozzle, in a different pass from the non-discharging nozzle, and executing a printing process on the basis of the supplementing printing data, the method further comprising prioritizing nozzles within the predetermined nozzle group, which differ from the non-discharging nozzle, at least one of the nozzles corresponding to the same raster line as a raster line that corresponds to the non-discharging nozzle and at least one of the nozzles corresponding to a different raster line that is disposed in the periphery of the raster line that corresponds to the non-discharging nozzle, over a nozzle outside the predetermined nozzle group and selecting the nozzles within the predetermined nozzle group as the supplementing nozzles.

* * * * *